Aug. 17, 1965     C. D. COFFIN     3,200,680
MACHINE TOOLS
Original Filed Jan. 26, 1960     12 Sheets-Sheet 1
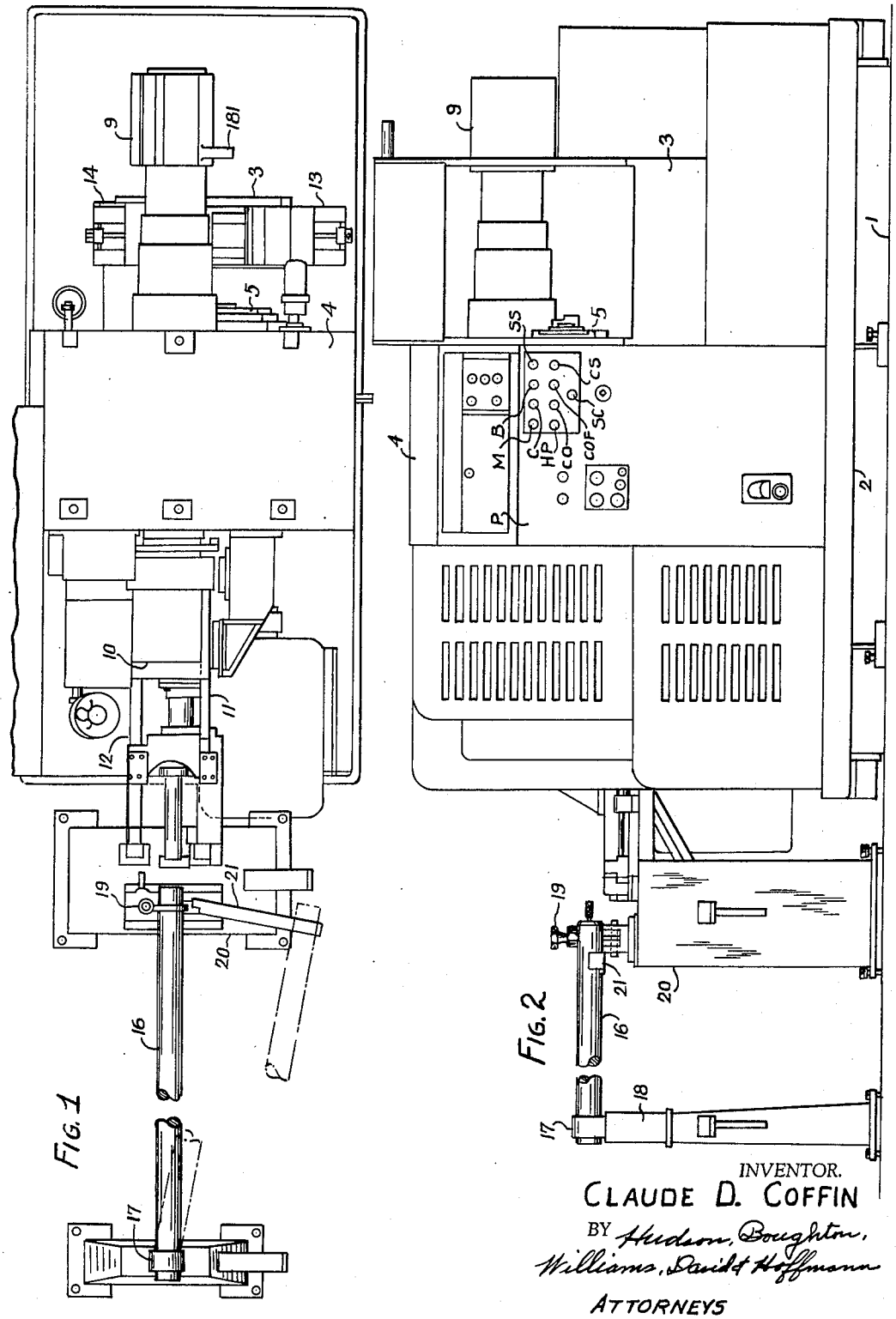
INVENTOR.
CLAUDE D. COFFIN
BY Hudson, Boughton,
Williams, David Hoffmann
ATTORNEYS

INVENTOR.
CLAUDE D. COFFIN
ATTORNEYS

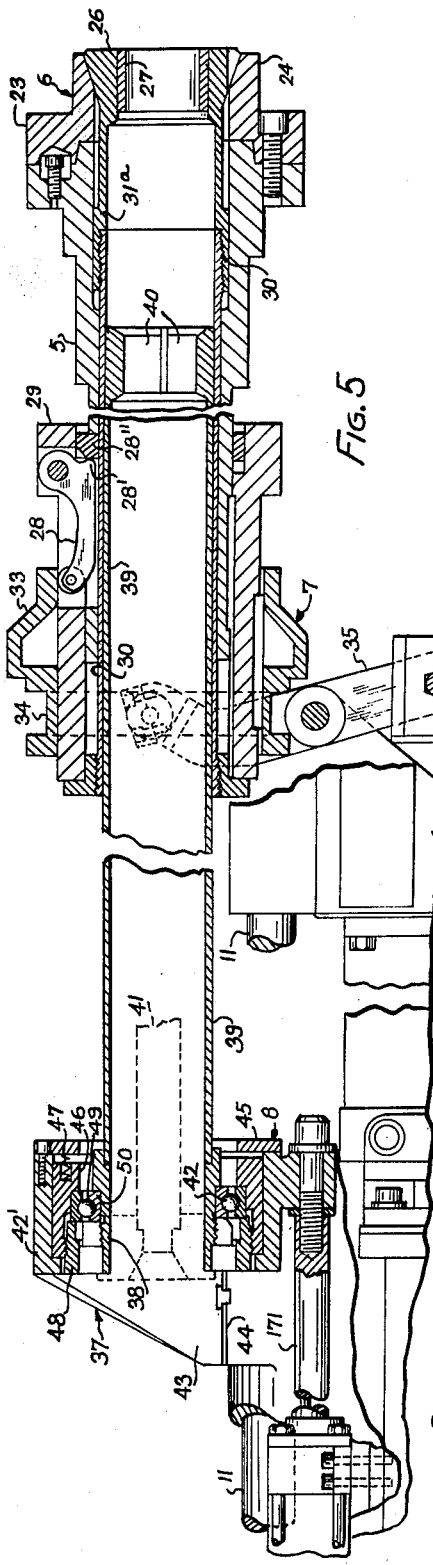

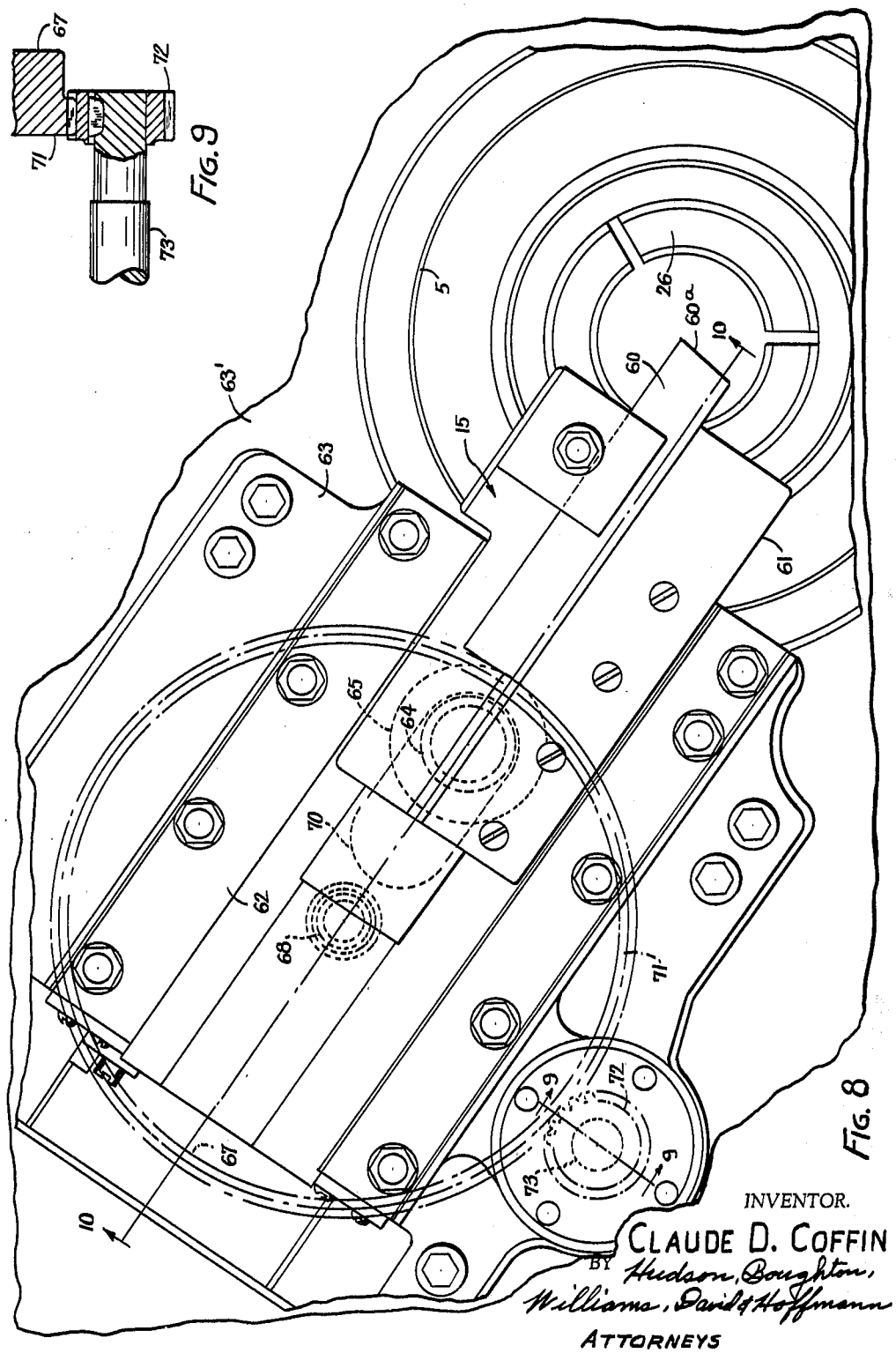

INVENTOR.
CLAUDE D. COFFIN
BY *Hudson, Boughton,
Williams, David & Hoffmann*
ATTORNEYS Aug. 17, 1965  C. D. COFFIN  3,200,680
MACHINE TOOLS Original Filed Jan. 26, 1960  12 Sheets-Sheet 12

INVENTOR.
CLAUDE D. COFFIN
BY Hudson, Boughton,
Williams, David & Hoffmann
ATTORNEYS 3,200,680
MACHINE TOOLS
Claude D. Coffin, Cleveland, Ohio, assignor to The Warner & Swasey Company, Cleveland, Ohio, a corporation of Ohio
Continuation of application Ser. No. 4,765, Jan. 26, 1960. This application July 27, 1964, Ser. No. 386,485
10 Claims. (Cl. 82—2.5)

This invention relates to machine tools and particularly to a single spindle automatic bar machine for performing operations on bar stock.

This application is a continuation of my copending application Serial No. 4,765, filed January 26, 1960, now abandoned.

According to the present invention, a machine tool is provided which is automatically operable to perform a number of operations on a workpiece in a preselected sequence. Although the present invention has many and varied uses, it is of particular advantage when employed in connection with automatic bar machines for machining bar stock. The machine of the present invention is designed to automatically repeatedly machine bar stock, cut off the machined piece and advance the bar to position it for a subsequent machining operation.

The present invention eliminates a number of hand operations previously required by an operator after the machine has finished its cycle and a particular bar has been machined and used up. In the present invention when a new bar has been loaded into the machine the operator actuates a single push button to initiate the substantially full automatic operation of the machine. This automatic operation includes the cutting off of a piece of the bar to square up the bar end, the machining cycle and the sequencing of the machine after the bar has been used wherein the remnant bar is ejected and parts of the machine are prepared for the loading of a new bar. When the bar has been depleted and a short length thereof remains, the machining operations are stopped automatically and certain parts of the machine are operated in the proper sequence so that the remaining short bar is automatically ejected from the machine and the machine is prepared to permit the loading of a new bar.

During the machining cycle a number of operations are performed in a preselected sequence. These operations include movement of a tool holding carrier or turret in forward and reverse directions longitudinally of the bar, indexing of the turret to a new tool supporting face, forward and reverse movement of a cutoff device for cutting off a piece of the bar, opening and closing of a bar gripping chuck and forward and reverse movement of a bar feeding mechanism. In the present invention these operations are performed automatically in a preselected sequence during the machining of the bar and in a different sequence after the bar has been shortened to a predetermined length.

Heretofore no provision has been made for automatically sequencing a bar machine after the last piece has been completed on a particular bar. It was previously necessary for an operator to perform a number of tiresome and time consuming hand operations to set up the machine after the bar had been used to condition it for the reception of a new bar. Furthermore, after these manual operations were performed and the new bar had been loaded, the operator was required to perform additional hand operations so that a small piece was cut off from the new bar to square up the end of the bar prior to the initiation of the machining operations. As an example, an operator has heretofore been required to operate a number of push buttons after the last piece of a bar has been machined to open the chuck, effect forward movement of the bar feed mechanism to remove the short piece, close the chuck after the new bar has been loaded, effect retraction of the bar feed mechanism, start rotation of the spindle, start the cut off operation, open the chuck, effect movement of the bar feed mechanism forward to advance the bar against a stock stop, again close the chuck and reverse the bar feed mechanism. Only after these operations have been performed can the machining operation of the machine be initiated.

By means of the present invention the operator merely loads in a new bar and operates a single push button to initiate substantially fully automatic operation of the machine. The machine will automatically go through the steps required to cut off a small piece of the bar to square up the end and then will proceed to effect the machining of the first piece and continue the machining cycle until the bar has attained a predetermined short length. When this occurs the turret remains in its retracted position and the cut off operation is initiated. When cut off of the last piece is completed, the cut off slide retracts and the spindle stops. The chuck then opens and the bar feed mechanism pushes the short piece from the chuck and the machine stops with the various parts thereof in a condition to receive a new bar. The operator then loads the new bar and presses the push button as before.

The machine is also designed so that the cut off operation can be initiated during indexing of the tool turret to any one of its stations. In addition, the cut off operation can be progressing simultaneously with a machining operation on the bar.

A further important aspect of the invention is the provision of an automatic bar machine wherein the various operations are automatically performed in the proper sequence by electrical control means which control the operated parts of the machine. The electrical control means includes a number of limit switches which are actuated at preselected times automatically to control electrical circuits.

It is therefore an object of the invention to provide a machine tool which is substantially fully automatic in operation whereby a number of tiresome and time consuming hand operations now necessary in known machines are eliminated and workpieces may be rapidly and accurately machined at low cost.

It is a further object of the invention to provide a bar machine of improved construction wherein the machine is automatically sequenced after machining operations on a bar have been completed to prepare for the reception of a new bar.

It is another object of the invention to provide a bar machine for automatically repeatedly performing machining operations on bar stock in a preselected sequence and to automatically sequence the machine after the bar has been used to condition the machine for reception of a new bar.

It is a further object of the invention to provide a machine as defined in the preceding object wherein the automatic performance of the machine is initiated by actuation of a single control switch.

It is a still further object of the invention to provide a machine as defined in the next preceding object wherein the machining operations are automatically stopped in response to the bar attaining a predetermined short length.

It is a still further object of the invention to provide an automatic bar machine effective in response to the actuation of a single control switch to automatically cut off a small piece from a new bar and then to proceed with the automatic machining of the bar and after the bar is used to eject the remnant bar and prepare for the reception of a new bar.

It is still another object of the invention to provide an automatic bar machine for performing operations on bar stock wherein the bar is repeatedly machined and advanced subsequent to the cutting off of a piece of bar with improved means for permitting the cut-off operation to be performed simultaneously during the machining operations on the bar.

It is a further object of the invention to provide a fully automatic bar machine including operated parts which are automatically operated in proper sequences by electrical control switches and circuits.

The invention will become apparent from the following description taken in conjunction with the accompanying drawings forming part of this specification, in which FIG. 1 is a view in top plan of a machine tool constructed in accordance with the teachings of the invention;

FIG. 2 is a view in front elevation of the machine shown in FIG. 1;

FIG. 5 is an enlarged fragmentary view with parts shown in section and parts shown in elevation illustrating the parts shown in FIGS. 3 and 4;

FIG. 6 is a diagrammatic representation of a fluid circuit for operating parts of the machine;

FIG. 8 is a view in side elevation showing the cut-off device for cutting off a piece of the bar;

FIG. 9 is a view in section taken along the line 9—9 of FIG. 8;

Figure 3:
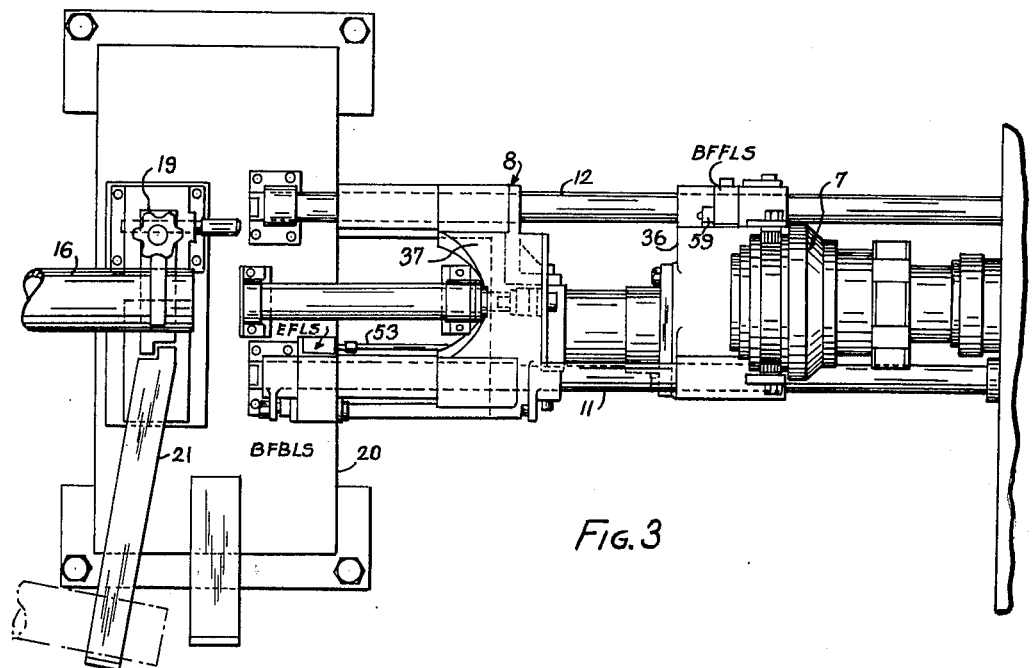
FIG. 3 is a fragmentary top plan view showing the bar feed mechanism and the chuck actuating assembly of the machine.
Figure 4:
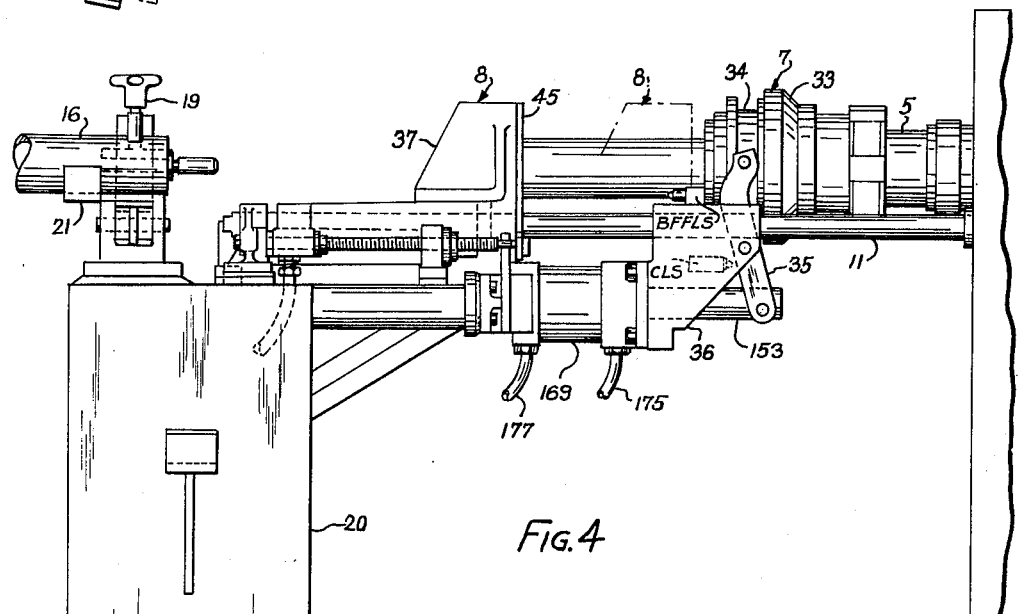
FIG. 4 is a fragmentary front elevational view of the parts illustrated in FIG. 3.

Although the invention will be described as employed in connection with a machine for operating on bar stock, it is understood that the principles of the invention may also be employed in connection with other types of machines for operating on work pieces of various configurations.

Referring initially to FIGS. 1 through 4, the main elements of the machine tool may now be described. The machine tool is supported on a surface 1 and includes a pan 2 and vertically extending frame and housing portions including the bed 3 and the headstock 4. The headstock rotatably supports a hollow spindle 5 which is provided at its outer end with a conventional collet chuck 6 (FIG. 5) as is well understood in the art. The collet chuck is arranged to open and close in order to respectively release and grip the bar stock. A control panel P is located at the front of the machine and includes a number of manually actuatable switches for controlling operation of parts of the machine.

In order to actuate the collet chuck there is provided in a conventional manner a chuck actuating mechanism 7 (FIG. 5) which will be described hereinafter in greater detail. The machine tool also includes a bar feeding mechanism 8 which is designed to move longitudinally of the spindle axis to advance the bar stock subsequent to the operation of the cutoff mechanism for cutting off a piece of the bar stock. The bar feed mechanism operates to advance the bar stock and then retracts to its rear position relative to the advanced bar stock. As will appear hereinafter, the bar feed mechanism operates automatically to advance the bar stock subsequent to opening of the collet chuck to a bar releasing position.

The machine also includes a tool carrier 9 in the form of a conventional turret which may have five or a different number of faces each including means to support suitable tools. The carrier 9 is part of an elongated support member extending through the headstock 4 and having at its left-hand end, as viewed in FIG. 1, a control drum 10 including means for adjustable mounting a number of switch actuating dogs for effecting various controlling functions, as will appear hereinafter. The turret 9 and the drum 10 are arranged for movement longitudinally of the spindle axis as a unit. The turret 9 is movable relative to the bar stock at feed and rapid forward and reverse traverse speeds so that the tools carried thereby may be quicky brought into and out of machining position and may be moved at a feed speed to effect the machining operation as will be understood. The turret and the drum 10 are also arranged for indexing rotation as a unit about an axis parallel to the spindle axis so that different faces and tools carried by the turret may be indexed into proper relationship to the bar stock. The support for the turret 9 is mounted for longitudinal movement by means of front and rear parallel extending ways 11 and 12.

In order to permit additional machining operations upon the bar stock there is provided a pair of conventional front and rear cross slides 13 and 14 mounted for movement transversely of the spindle axis. As will presently appear, these cross slides are movable at rapid traverse and feed speeds as will be well understood.

In order to cut off a piece of the bar which has been machined, there is provided a separate cutoff mechanism 15 (FIG. 8) which is mounted for movement at rapid traverse and feed speeds transversely of the spindle axis.

There is provided a support tube 16 for supporting the bar stock when the stock is loaded into the machine. The tube 16 at its left-hand end as viewed in FIG. 1 is secured to a pivot head 17 which is mounted by a support 18 for pivotal movement about a vertical axis as viewed in FIG. 2. A clamp device 19 is provided at the right-hand end of the tube, as viewed in FIG. 1, for clamping the tube in its operative bar supporting position. The clamp 19 is carried by a suitable support 20 and mounts an arm 21 which extends toward the observer, as viewed in FIG. 2. The arm 21 is designed to support the tube 16 when the tube is pivoted with pivot head 17 about its vertical axis.

The spindle 5, at its right-hand end as viewed in FIG. 5, has an annular flange 23 secured thereto which has an extending nose 24 with a frusto-conical opening in which is received resilient jaws 26 of the collet chuck. As is conventional in the art, resilient pads 27 may be secured to the jaws 26 to grip the bar stock. In order to open and close the collet chuck, there is provided a plurality of pivoted fingers 28 (only one of which is shown) which are pivoted to a housing 29 secured as by threading a sleeve 30, which is slidable freely within the spindle 5. The sleeve 30 is secured as by threading to a thin wall section 31a of an extension from the resilient jaws 26.

The fingers 28 include short projections 28' which engage a reaction ring 28" forming part of the spindle. The fingers 28 carry rollers which cooperate with an inner tapered surface of a hollow cone 33 which is slidable on the outer surface of the housing 29. The cone 33 includes an annular groove 34 in which may be positioned a pair of rollers carried by forked extensions of a lever 35 which is pivotally secured intermediate its ends to a bracket 36 supported by the ways 11 and 12. When the lever is pivoted it effects sliding movement of the cone 33 relative to the housing 29 and relative to the fingers 28 so that the fingers 28 are pivoted and the sleeve 30 is moved to the right or left, depending upon the direction of pivotal movement of the lever. As a result, the collet chuck can be opened or closed by actuation of the lever 35. If the lever 35 is pivoted in a clockwise direction as viewed in FIG. 5, then the cone 33 is moved to the right and the finger 28 is pivoted in a clockwise direction by the resiliency of the jaws 26 so that the sleeve 30 is moved to the right which opens the collet. Pivoting the lever 35 in a counterclockwise direction operates to close the collet.

Operation of the collet chuck is effective to actuate a limit switch CLS (FIG. 4) which is conveniently carried by the bracket 36. The switch CLS is in the path of movement of the lever 35 and is actuated by the lever when the lever is pivoted. As will appear hereinafter, the switch CLS controls a number of electrical circuits.

As best shown in FIG. 5, the bar feed mechanism includes an axially movable, nonrotatable head assembly 37 supported on the ways 11 and 12 and which surrounds an inner hollow sleeve 38 which has secured thereto as by welding a feed finger tube 39 extending slidably within the collet actuating sleeve 30. The tube 39 carries at its right-hand end, as viewed in FIG. 5, a plurality of resilient fingers 40 which are arranged to grip the bar stock during advancement of the bar feed mechanism to move the bar forward through the then open collet chuck, and to move relative to the bar stock when the bar feed mechanism is retracted subsequent to closing of the collet chuck. The fingers 40 are designed to be in continuous engagement with a bar except when the bar attains a predetermined short length. The sleeve 38 may have secured thereto a filler tube 41 which then extends through the finger tube 39 to accommodate bars of small cross-sectional area. When such small bars are used, the fingers 40 are modified to permit gripping of the smaller bars but when smaller bars are not used, the filler or adapter tube 41 is removed.

The sleeve 38 and the tube 39 are supported to rotate with the spindle relative to the head assembly 37 by means of suitable bearings 42 between the head assembly 37 and the sleeve 38.

Figure 18:
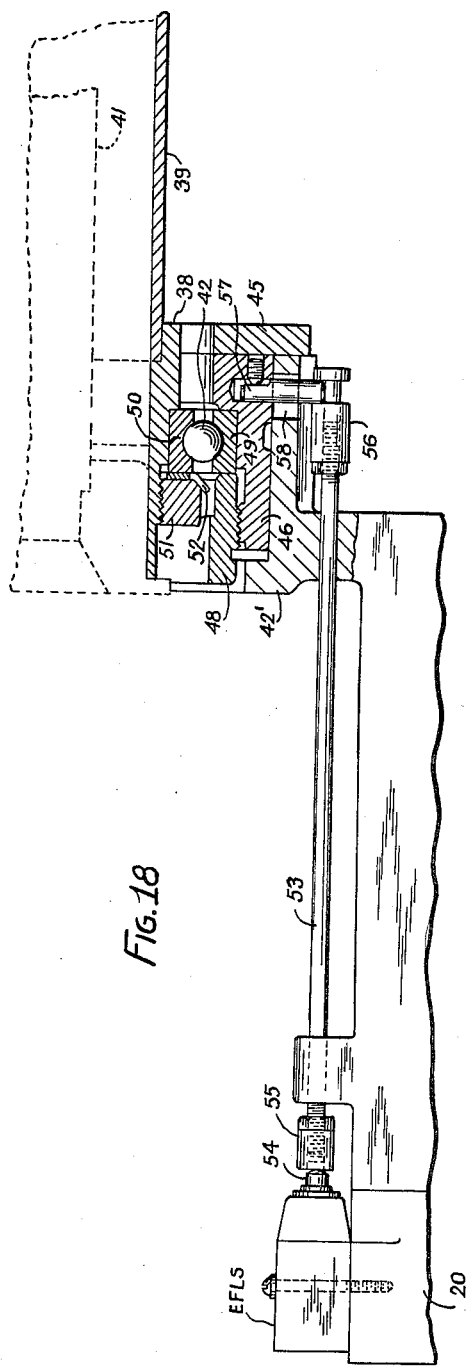
FIG. 18 is an elevational view showing a portion of the bar feed mechanism is retracted position and a limit switch associated therewith.

As shown in FIGS. 5 and 18, the head 37 includes an annular part 42' having depending portions 43 on each side thereof to which are secured hollow members 44 through which extend the ways 11 and 12. A ring 45 is attached to the right-hand face of the part 42' to surround the finger tube 39. A ring-shaped member 46 is positioned within the part 42' and is biased to the left in the absence of a bar to engage a shoulder of the part 42' by means of a plurality of springs 47 (FIG. 5) located within recesses of the member 46 and engaging the inner surface of the ring 45. When in engagement with the shoulder of part 42', the member 46 is spaced longitudinally of the ring 45 to provide a gap therebetween. The feed finger tube 39 is rotatably supported within the member 46 by a bearing 42 having an outer race 49 and an inner race 50. An externally threaded member 48 threads into the member 46 and engages the outer bearing race 49 to hold it against a shoulder of the member 46. The inner race 50 is secured in position by means of a lock nut 51 threaded on the sleeve and engaging with a washer 52.

The finger tube 39 and sleeve 38 with nut 51 secured thereto rotate within the bearing 42 and the latter's associated parts when the work spindle and the bar stock in the finger tube 39 and gripped by the collet chuck 6 are rotating as will be well understood.

FIG. 18 illustrates the relationship of the parts of the bar feed mechanism 8 when the latter is in its most retracted position and bar stock is in the finger tube 39 and is being gripped by the fingers 40. A switch actuating rod 53 is carried by the bar feed mechanism 8 and is slidable relative thereto by being slidably mounted in spaced bearing bores formed therein. The rod 53 at its right-hand end, as viewed in FIG. 18, is provided with a member 56 adjustable thereon and having an annular groove in which is positioned the free end of a pin 57 extending into an opening of the member 46 through an elongated slot 58 in the wall of the annular part 42' of the head 37 of the bar feeding mechanism. The pin 57 is fixed to the member 46 by a suitable setscrew.

The opposite or left-hand end of the rod 53, as viewed in FIG. 18, adjustably mounts a nut 55. A limit switch EFLS (empty finger limit switch) is secured to the fixed support 20 of the machine. The nut 55 on the rod 53 is adjusted so that it will just be in non-actuating engagement with the actuating member 54 of the switch EFLS when the bar feed mechanism 8 is in its most retracted position prior to its forward feeding movement and the fingers 40 of the finger tube 39 are gripping bar stock. This is the condition illustrated in FIG. 18 and it will be noted that the ring 45 of the head of the bar feed mechanism is contacting the right hand end of the member 46 and the springs 47 therebetween are compressed.

Assuming the initiation of the forward or feeding movement of the bar feed mechanism 8 while bar stock is being gripped by the fingers 40, the member 46, sleeve 38 and finger tube 39 momentarily are stationary due to the frictional grip of the fingers 40 on the bar stock.

This condition obtains until the inner side of the annular flange at the left side of the part 42' of the head 37 of the bar feed mechanism engages the left hand end of the member 46, after which the member 46, sleeve 38 and finger tube 39 move unitarily with the part 42' to effect feeding movement of the bar. When this unitary movement of the referred to elements takes place there is a gap between the ring 45 and the right hand end of the member 46 and the springs 47 are expanded.

During the initial and momentary position of the forward or feeding movement of the bar feed mechanism relative to the then stationary member 46, sleeve 38 and tube 39 thereof, the rod 53 is held stationary by the pin 57 carried by the member 46 and the bar feed mechanism moves slidably toward the right relative to said rod. When the member 46, sleeve 38 and finger tube 39 thereafter move unitarily with the part 42' of the bar feed mechanism to feed the bar stock the rod 53 moves as a unit therewith toward the right and without any relative movement between it and the bar feed mechanism.

Now assuming that the bar feed mechanism has fully advanced in the bar feeding direction, the parts are in the relationship shown in FIG. 5. When this condition obtains the movement of the bar feed mechanism at the proper time in the cycle is automatically reversed by means hereinafter explained and said mechanism starts to move from its advanced right hand bar feed position toward its fully retracted left hand position. The initial part of this retracting movement causes the part 42' of the bar feeding mechanism and ring 45 secured thereto to move relative to the member 46, sleeve 38 and finger tube 39 until the ring 45 compresses the spring 47 and engages the right hand end of the member 46, after which said member 46, sleeve 38 and finger tube 39 will move as a unit with the part 42' of the bar feed mechanism and with the ring 45 in engagement with the member 46 as indicated in FIG. 18 with the gap between said ring and member being closed.

The relative movement last referred to occurs because the frictional engagement of the fingers 40 with the bar stock restrains the member 46, sleeve 38 and finger tube 39 against retracting movement until said elements are positively moved by the ring 45 engaging therewith and moving as a unit with the part 42' to which the ring is secured. When all of the parts of the bar feed mechanism move rearwardly as a unit then the fingers 40 frictionally slide along the bar stock until the bar feed mechansim is in its most retracted position, i.e., the position of FIG. 18.

When the bar feed mechanism commences its rearward movement after completing its forward movement, the nut 55 on the rod 53 is spaced from the actuator 54 of the switch EFLS and hence the rod 53 is functionally idling during the rearward movement of the bar feed mechanism and at the end thereof the nut 55 is just contacting the switch actuator 54 as previously explained and as shown in FIG. 18.

When the bar feed mechanism reaches its most rearward position and bar stock is in the fingers 40 it will automatically be caused to move in the forward or bar feeding direction as soon as a workpiece has been machined and cut off by mechanism hereinafter described. The described functioning of the bar feeding mechanism hereinbefore set forth is the normal functioning thereof when bar stock is in the fingers 40.

Now assuming that the bar feed mechanism is in its most forward bar feed position and starts its rearward movement when the bar stock has been substantially used up in the production of workpieces so that only a remnant of the stock is present in the collet chuck. Under such conditions as soon as the fingers 40 leave the remnant of bar stock so there is no frictional resistance offered to the movement of the fingers 40 along the bar stock then the springs 47 are of sufficient strength to expand and to move the member 46 away from the ring 45 to provide a gap therebetween and until the member 46 engages the annular flange at the left hand side of the part 42' of the bar feed mechanism. When this condition obtains and the bar feed mechanism reaches its most retracted or left hand position the member 46 is in a left hand position further than its normal left hand position when the bar feed mechanism is fully retracted, that is, the member 46 is farther to the left by the distance of the gap between the ring 45 and the right hand end of the member 46. Consequently this additional left hand movement of the member 46 acts through the pin 57 to move the rod 53 toward the left relative to the bar feed mechanism so that the nut 55 which normally just contacts the switch actuator 54 now functions to move said switch actuator 54 and operate the limit switch EFLS. This operation of the limit switch EFLS closes the normally open contact 290 thereof, see FIG. 17.

The actuation of switch EFLS as just described occurs prior to the completion of the machining of the last workpiece in the collet chuck of the machine. The control circuit, as later explained, is such that the machine completes its operative cycle and the machining of the last workpiece and then, due to the operation of switch EFLS, stops its sequential operations although the work spindle continues to rotate. That is, the cutoff slide, the cross slides and turret slide then will be in retracted position and the turret will be indexed to position the stock stop to be engaged by the end of the new bar stock when the latter is loaded into the machine. The cutoff tool then will have cut off the last workpiece, the collet chuck will be open and the bar feed mechanism will have moved to its most forward bar feed position. The operator now loads a new length of bar stock into the bar feed mechanism until the end thereof projects through and beyond the collet chuck to a position where it can be squared off by the cutoff tool. The operator now presses the cycle start button whereupon the collet chuck closes, the cutoff slide moves forwardly and the cutoff tool squares the end of the new bar stock and the cut-off slide retracts, the bar feed mechanism retracts, the collet chuck opens, the bar feed mechanism feeds the bar stock forwardly against the stock stop and the machine continues automatically to function to perform the sequential operations of the work cycle. The control means for effecting the operations referred to are explained in detail hereinafter.

It will be understood that the machine continues automatically to machine workpieces from the new length of bar stock until the feed fingers 40 leave the remnant of the bar stock and the EFLS switch is again actuated as explained above.

When the bar feed mechanism is moved to its fully forward position to advance the bar, it actuates a limit switch designated as bar feed forward limit switch BFFLS (FIG. 3) which may be a conventional microswitch. This switch is shown as mounted by the bracket 36 and has an actuating member 59 which is engageable by the head 37 to operate the switch for effecting controlling functions described hereinafter.

An additional switch designated as bar feed back limit switch BFBLS (FIG. 3) is actuated when the bar feed mechanism is fully retracted to initiate certain control functions. This switch is a conventional microswitch and is carried by the support 20 so that its actuating member is engaged by a part of the bar feed mechanism when such mechanism is fully retracted.

The details of construction of the cut-off mechanism 15 may now be described. As shown in FIG. 8, the cut-off mechanism includes a cut-off blade 60 having a sharp edge 60a which is arranged to cut off a piece of the bar. The blade 60 is secured to a toolholder 61 which is in turn attached to a slide 62. The slide is adapted to reciprocate along an axis extending transversely of the spindle axis so that the blade 60 may be advanced and withdrawn with respect to the bar. For this purpose the slide 62 is slidably mounted by means of a support 63 which may be attached to a portion 63' of the machine.

Figure 10:
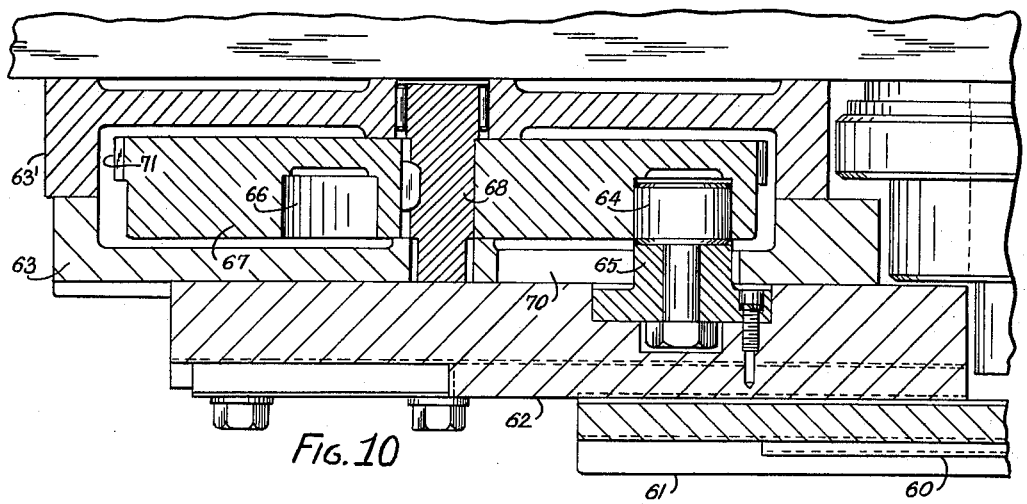
FIG. 10 is a view in section taken along the line 10—10 of FIG. 8.

In order to effect movement of the slide 62 a cam follower wheel 64 is rotatably supported by a bracket 65 which is secured to the upper portion of the slide as viewed in FIG. 10. The wheel 64 is positioned within a spiral groove 66 formed in a cam disk 67 which is keyed to a shaft 68 mounted for rotation by the support 63 and the portion 63'. When the cam disk 67 is rotated the groove 66 will move with respect to the wheel 64 and due to the variable radius of the groove the slide 62 will be displaced to the right or left, as viewed in FIG. 10, depending upon the direction of rotation of the cam disk 67. It is noted that the support 63 includes a horizontally extending slot 70 to accommodate the upwardly extending neck of the bracket 65 during movement of the slide 62.

The cam disk 67 is formed on its periphery with gear teeth 71 which mesh with a gear 72, shown in FIG. 8, which when rotated will effect rotation of the cam disk 67. As shown in FIG. 9, the gear 72 is keyed to a shaft 73 which is driven from the spindle 5 through a transmission described hereinafter. The shaft 73 in FIG. 9 is a continuation of the shaft 73 shown in FIG. 11, which in turn is operatively connected to a shaft 74, shown in FIG. 7. As will presently appear the slide 62 is moved at rapid traverse and feed speeds which are proportional to the speed of rotation of the spindle.

Figure 7:
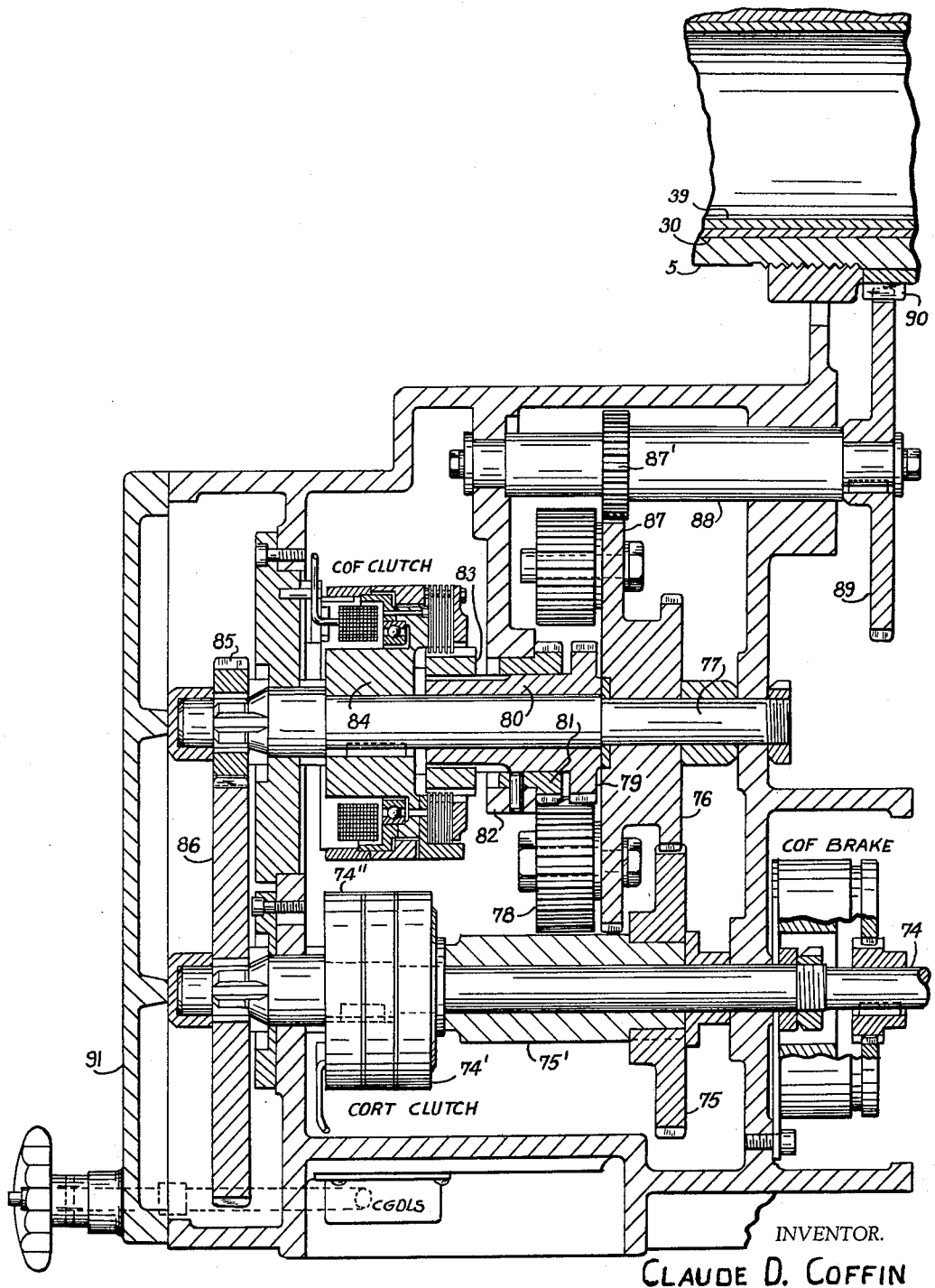
FIG. 7 is a view in section showing the transmission for effecting movement of the cut-off device at feed and rapid traverse speeds.

The transmission for driving the cutoff slide 62 at feed and rapid traverse rates correlated to the rotation of the spindle 5 is illustrated in FIG. 7 and includes a shaft journaled for rotation in spaced portions of the transmission housing. An electrically operated cutoff feed brake COF is mounted on the shaft 74 and acts when energized to prevent rotation of said shaft. As previously stated, the shaft 74 is operatively connected to the shaft 73 which drives the cam disk 67 that actuates the cutoff slide 62.

The sleeve 75' is freely rotatable on the shaft 74 and has fixed thereto a gear 75. The sleeve 75' is operatively connected to one element 74' of a magnetic clutch designated as the cutoff rapid traverse clutch CORT and which element is freely rotatable on the shaft 74 with the sleeve 75' and gear 75. The element 74" of the magnetic clutch CORT is splined to the shaft 74, wherefore when the clutch is engaged, rotation of gear 75 and sleeve 75' acts through clutch element 74' to rotate clutch element 74" and, in turn, the shaft 74. The shaft 74 beyond the CORT clutch has fixed thereto a gear 86.

The transmission housing also rotatably mounts a shaft 77 parallel to the shaft 74. A two-gear cluster is freely rotatable on the shaft 77 and consists of a smaller gear 76 which constantly meshes with the gear 75 and a larger gear 87. The gear 87 of the two-gear cluster constantly meshes with a gear 87' fixed on shaft 88 rotatably carried by the transmission housing in parallel relationship to the shafts 77 and 74. The shaft 88 extends outwardly of the transmission housing and has fixed thereto a gear 89 which constantly meshes with a gear 90 fixed to the spindle 5.

It will be seen that when the spindle 5 is rotating the two-gear cluster will freely rotate on the shaft 77 and the gear 75 and sleeve 75' will freely rotate on the shaft 74, provided the CORT clutch is disengaged.

The larger gear 87 of the two-gear cluster has secured thereto in parallel relationship to the axis of the gear but spaced radially therefrom a stub shaft on which a wide gear 78 is free to rotate. The gear 78 constantly meshes with a gear 79 formed on a sleeve 80 that is freely rotatable on the shaft 77. Also the gear 78 meshes with a gear 81 fixed to a portion 82 of the transmission housing and within which gear 81 the sleeve 80 is free to rotate. The gear 79 may be of the same pitch as, but will have a greater number of teeth than the fixed gear 81, as for example the gear 79 may have one more tooth than does the gear 81.

In FIG. 7, the gear 87 is shown as mounting an independently rotatable gear similar to the gear 78 and located intermediate the shafts 88 and 77. It will be noted that the gear 78 is of larger diameter than the other gear carried by the gear 87. If it is desired to change the gear ratio the gears 79 and 81 on the shaft 77 may be replaced with larger gears which would mesh with the other gear referred to carried by the gear 87 and at such time the gear identified by the numeral 78 would be removed from the gear 87.

It will be seen that when the gear 76 is rotatably driven through the gears 87', 89 and 90 by the spindle 5 and is rotating freely on the shaft 77, the gear 78 will roll around the fixed gear 81 which functions as a circular rack and such rolling of the gear 78 will impart rotation thereto on its own axis in addition to its circular orbital movement about the shaft 77, due to the rotation of the gear 87 of the two-gear cluster. The independent rotation of the gear 78 about its own axis, due to its rolling engagement with the fixed gear 81 and the greater number of teeth in the gear 79 than in the gear 81 imparts an increment of rotative movement to the gear 79 relative to the gear 81. Hence the sleeve 80 that carries gear 79 rotates on shaft 77.

The sleeve 80 has splined thereto the shiftable element 83 of a magnetic clutch which is identified as the cutoff feed clutch COF. The other and fixed element of the magnetic clutch COF is keyed to the shaft 77 and hence when said clutch is engaged the rotation of gear 79, sleeve 80, clutch element 83, acts through the clutch element 84 to rotatably drive the shaft 77. The shaft 77 beyond the COF clutch has fixed thereto a pick-off gear 85 which constantly meshes with the pick-off gear 86 fixed to the shaft 74.

As previously stated, the shaft 74 may be driven at rapid traverse or feed speeds in timed relation to the rotation of the spindle 5 and such drive of the shaft 74 imparts rapid traverse or feed movements to the cutoff slide.

Assuming that the COF clutch is disengaged and the CORT clutch is engaged, the shaft 74 is driven for rapid traverse of the cutoff slide from the spindle 5 through gears 90, 89, shaft 88, gear 87', gear 76 of the two-gear cluster on shaft 77, gear 75, sleeve 75', and the now engaged clutch elements 74' and 74" of the CORT clutch. At such time, the COF clutch will be disengaged and the rotation of the two-gear cluster on the shaft 77 and the rotation of the gear 78 on its own axis as it rolls around the fixed gear 81 merely imparts an idle rotation to gear 79, sleeve 80 and element 83 of the COF clutch. Inasmuch as the shaft 74 is rotating and has fixed thereto the gear 86 which meshes with the gear 85 fixed to the shaft 77, the latter will rotate idly within the rotating two-gear cluster, the sleeve 80 of the gear 79 and clutch element 83, while the element 84 of the COF clutch will rotate idly with the shaft 77 and relative to element 83.

Now assuming that the CORT clutch is disengaged and the COF clutch is engaged to impart feeding movement to the cutoff slide, the transmission illustrated in FIG. 7 operates as follows: The rotation of the two-gear cluster on the shaft 77 causes the gear 78 to roll around the fixed gear 81 to give the gear 78 independent rotation on its own axis and such independent rotation drives the gear 79 and sleeve 80 and element 83 of the COF clutch due to the greater number of teeth in gear 79 than in gear 81, which at this time is engaged with the element 84 thereof so that the shaft 77 is rotated on its axis within the two-gear cluster and sleeve 80. This rotation of the shaft 77 acts through the pick-off gears 85, 86 to drive the shaft 74 at a rate to produce feeding movement of the cutoff slide.

When the shaft 74 is thus rotating for cutoff slide feed the gear 75 driven by the gear 76 and the sleeve 75' and element 74' of the now disengaged CORT clutch have independent and idle rotation on the shaft 74 while element 74" rotates with shaft 74 and relative to element 74'.

The engagement and disengagement of the COF brake, the CORT clutch and the COF clutch are effected automatically during the sequence of the operative cycle by control means hereinafter explained in detail.

The transmission housing includes a closure 91 which may be opened from its illustrated closed position to expose the transmission mechanism. The closure 91 is effective to control operation of a switch designated as switch CGDLS. This switch is operated when the closure is in its illustrated closed position and includes contacts in the electrical control circuits, as described hereinafter.

Figure 11:
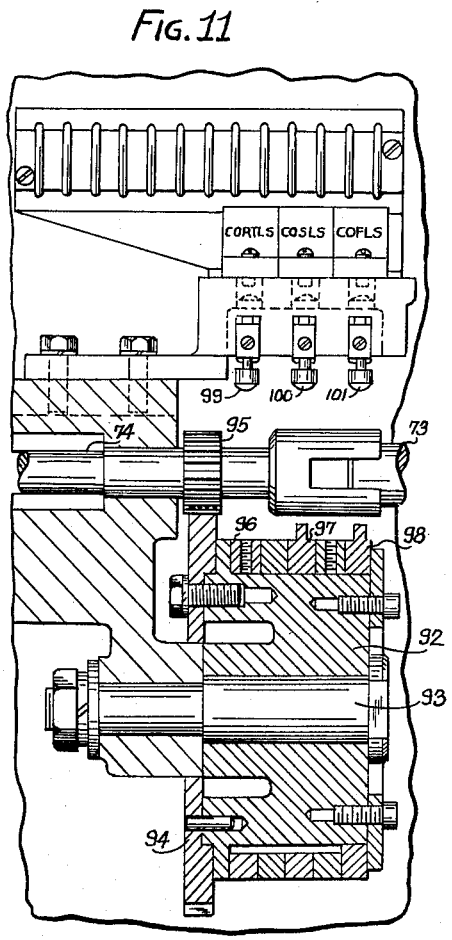
FIG. 11 is a developed view in section showing parts of the cut-off device and the cam drum operated with the cut-off slide.
Figure 12:
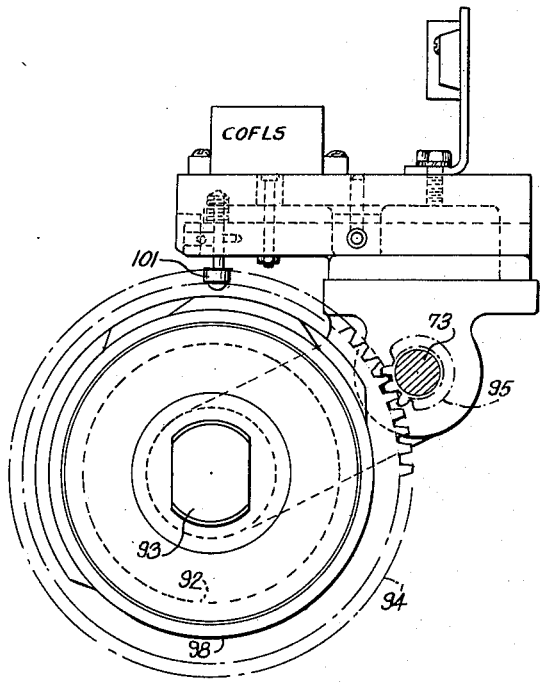
FIG. 12 is a view in elevation showing the cam drum illustrated in FIG. 11 and the mounting thereof.

Referring now to FIGS. 11 and 12, there is illustrated a control arrangement which is operative during movement of the slide 62 to effect certain controlling functions. This control arrangement includes a cam drum 92 which is secured to a shaft 93 journaled by a portion of the machine structure. The drum 92 is rotated by means of a gearing arrangement including a gear 94 carried by the drum 92 in meshing engagement with a gear 95 fixed to the shaft 74 which, as previously described, is rotated at a speed proportional to the spindle speed. With this arrangement the drum 92 will rotate at a speed which is proportional to the speed of movement of the slide 62.

The drum 92 mounts a plurality of cam disks which cooperate with a plurality of switches to effect controlling functions during movement of the slide 62. In the illustrated embodiment the drum 92 mounts three cam disks 96, 97 and 98 which have peripheral camming surfaces of preselected configuration for engaging in predetermined sequence actuating elements 99, 100, 101 of limit switches designated respectively as the cut off rapid traverse limit switch CORTLS, the cut off slide limit switch COSLS, and the cut off feed limit switch COFLS.

The purpose of these switches will be described hereinafter.

Figure 13:
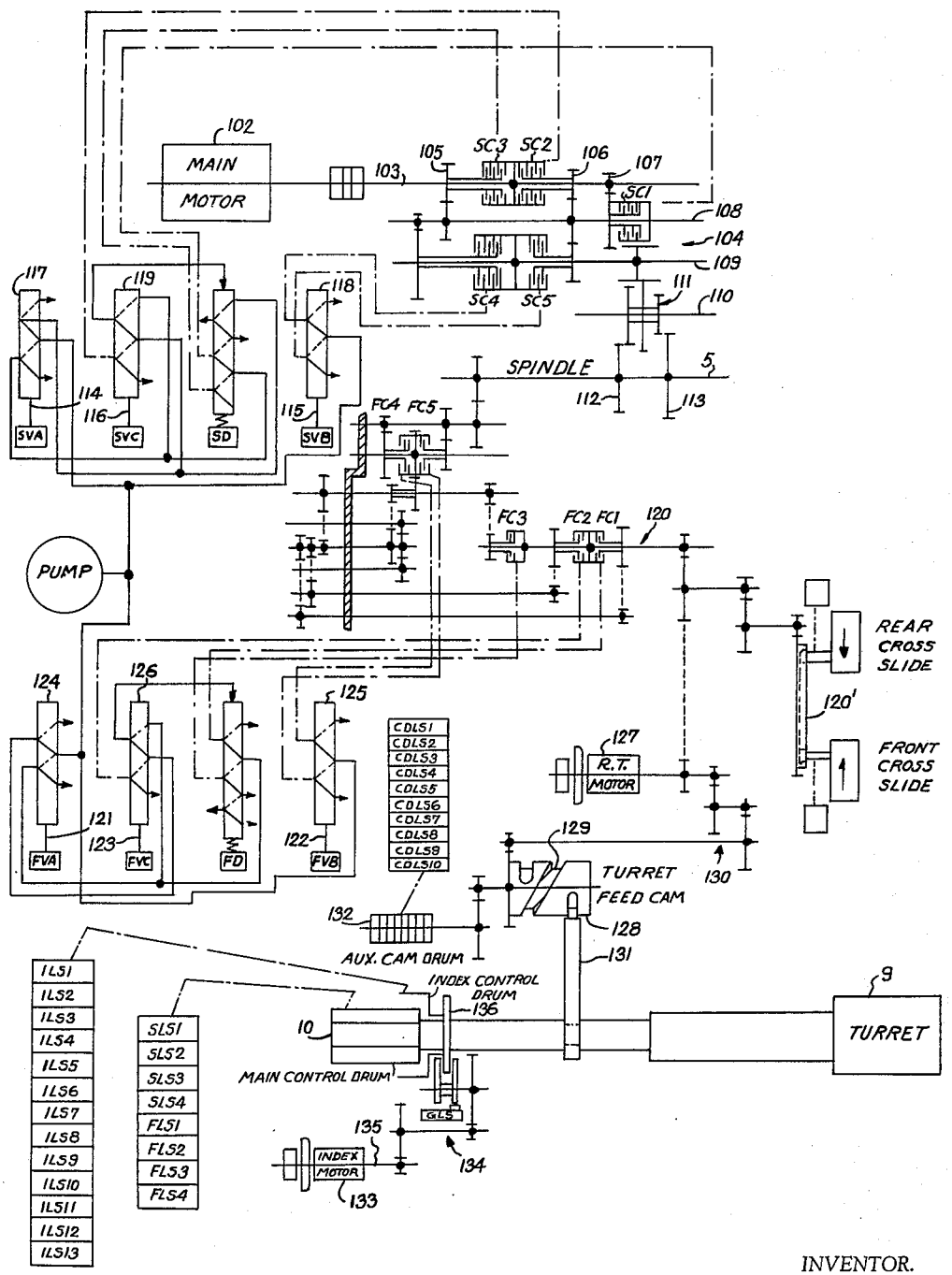
FIG. 13 is a diagrammatic representation of the machine including transmissions and fluid circuits utilized therein.
Figure 14:
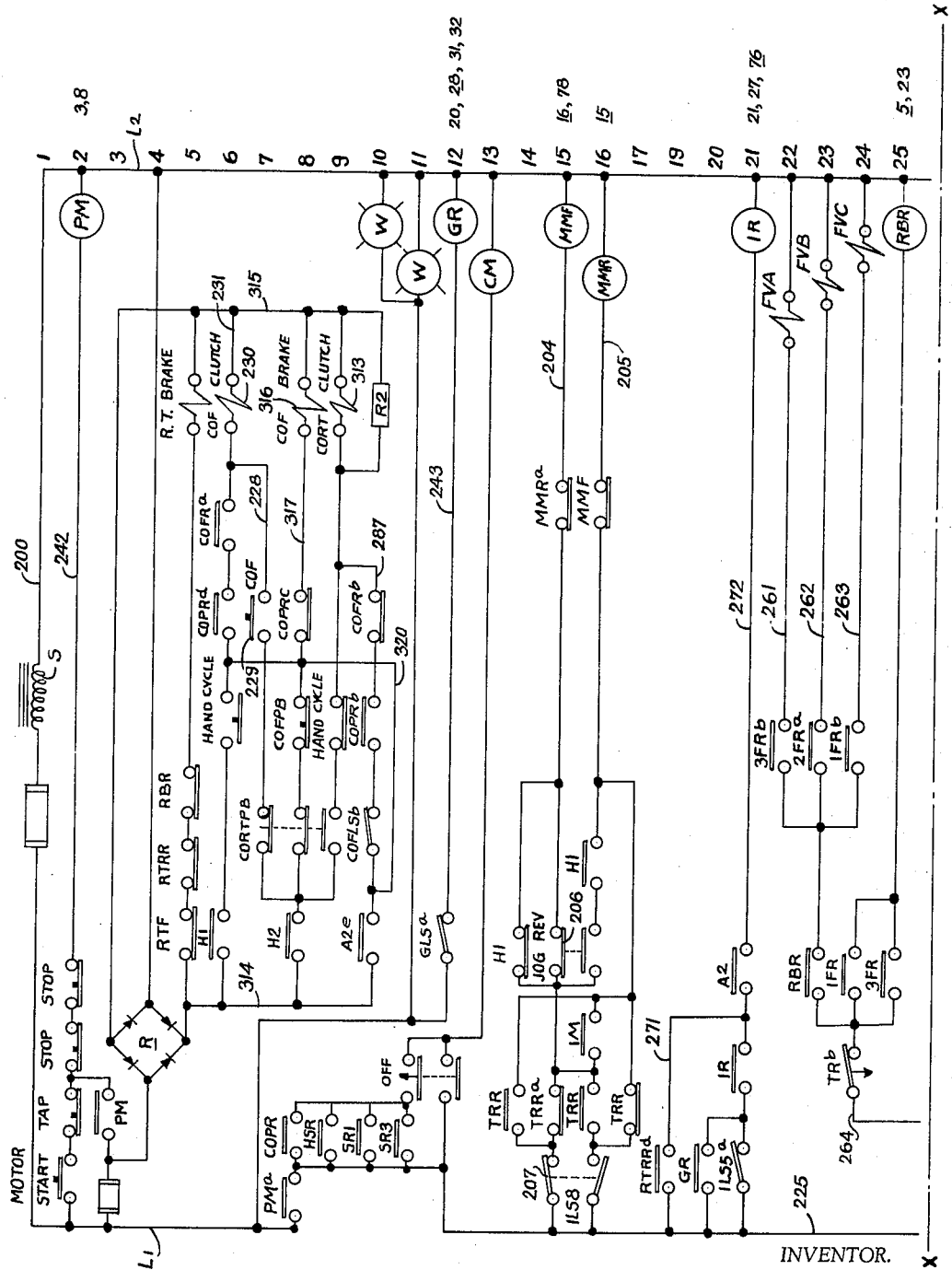
FIGS. 14 through 17 are diagrammatic representations of electrical control circuits employed in the machine.

Referring now to FIG. 13, there is diagrammatically illustrated portions of the machine tool including transmissions and fluid circuits for operating the transmissions to control movement of the spindle, turret and the front and rear cross-slides. The power for driving the various parts is supplied by a suitable electrical motor 102 having a motor shaft 103 which drives the spindle 5 through a transmission 104 which may be of conventional design similar to the transmission disclosed in FIG. 5 of Patent No. 2,644,222. Briefly, the transmission 104 includes a pair of gears 105 and 106 loosely carried by the shaft 103 to be selectively fixed to the shaft by means of a pair of fluid operated clutches SC2 and SC3. The shaft 103 also has fixed thereto a gear 107. The gears carried by the shaft 103 mesh with gears carried by a shaft 108, which in turn mesh with gears carried by a shaft 109. A shaft 110 carries a suitable shiftable gear arrangement 111 which is arranged to selectively drivingly engage gears 112 and 113 fixed to the spindle 5 to obtain either a high or low speed range. The shaft 108 carries a clutch SC1 and the shaft 109 mounts a pair of clutches SC4 and SC5. The transmission 104 is designed to effect rotation of the spindle 5 at ten different speeds, including five speeds within a low speed range and five speeds within a high speed range.

The various clutches in the transmission 104 are of the fluid operated type and are arranged to be operated under the control of a plurality of electrically energizable solenoids SVA, SVB and SVC having respectively armatures 114, 115 and 116 which are connected to shiftable bodies 117, 118 and 119 of a plurality of valves. When the solenoids are energized and deenergized the valve bodies will shift to control the application of a pressure fluid from a pump to the clutches SC1 through SC5. As will presently appear, the solenoids are selectively energizable under the control of limit switches to establish the desired spindle speed.

The front and rear cross-slides are of conventional construction and are arranged to be driven at feed and rapid traverse speeds to perform tooling operations upon the bar stock. As is conventional, the front and rear cross-slides are adapted for movement at feed speeds which are proportional to the speed of rotation of the spindle. For this purpose the cross-slides are drivingly connected to the spindle by means of a transmission 120 and a cam 120' which may be of conventional construction. This transmission includes a plurality of fluid operated clutches FC1 through FC5, which are operated by a plurality of electrically energizable solenoids FVA, FVB and FVC. These solenoids have armatures 121, 122 and 123 connected to shiftable bodies 124, 125 and 126 of a plurality of valves which are shiftable to control the application of pressure fluid to the clutches FC1 through FC5. The arrangement is such that any one of three feed speeds may be selected for the cross-slides.

The cross-slides may also be moved at rapid traverse speeds so that they may be rapidly advanced and retracted with respect to the bar stock. For this purpose a reversible rapid traverse motor 127 is provided which may be operatively connected to a part of the transmission 120 to move the cross-slides in opposite directions at the rapid traverse speed.

Figure 15:
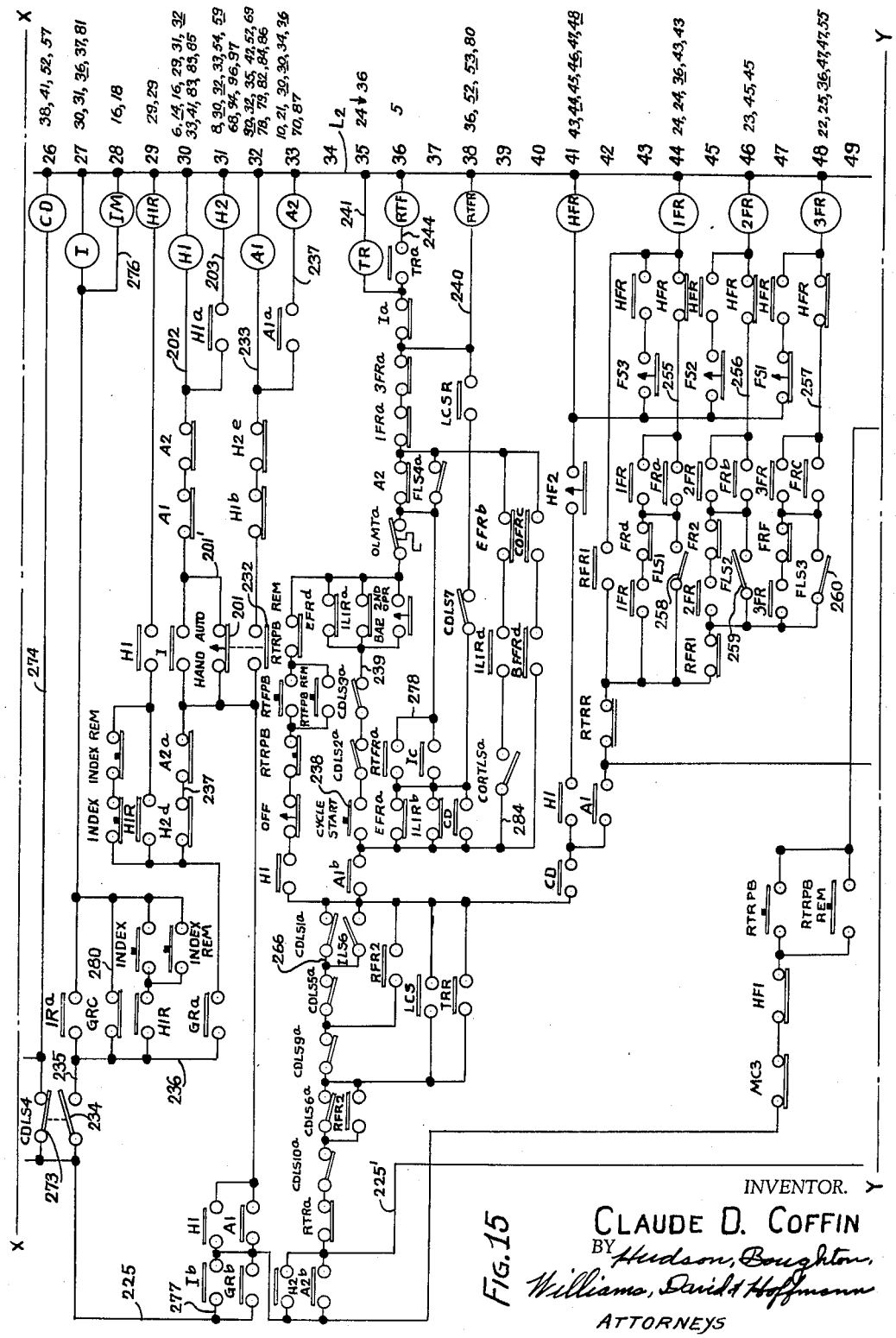
Figure 16:
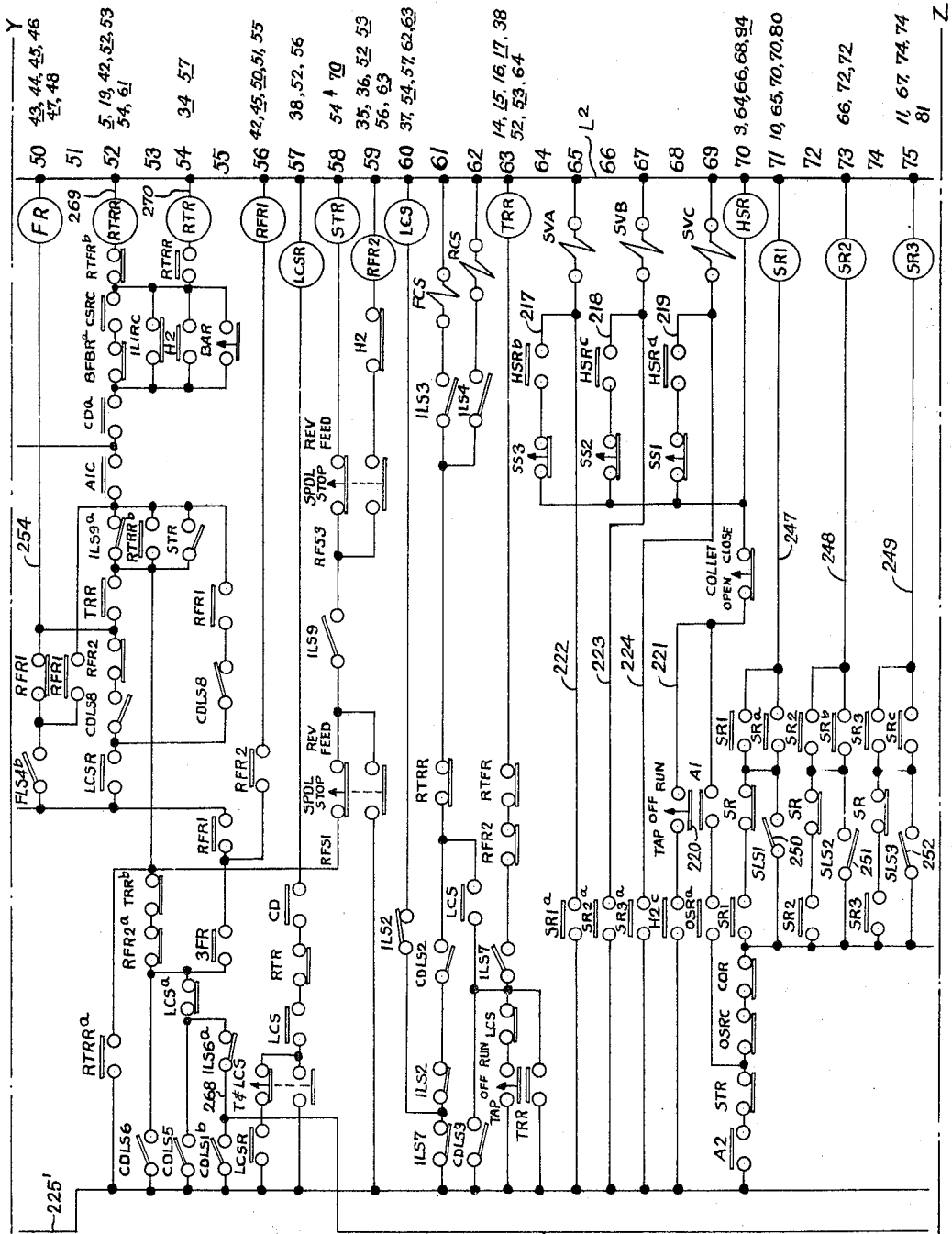

As stated hereinbefore, the machine tool includes a pentagon turret 9 having five faces with means for supporting tools thereon. The turret 9 is mounted for movement longitudinally of the spindle axis at feed and rapid traverse speeds and is additionally mounted for indexing rotation about the longitudinal axis to index the tool supporting faces into tooling relationship relative to the bar stock. The turret is moved longitudinally of the spindle axis by means of a turret feed cam 128 which has a spiral groove 129 therein, as described in the aforementioned patent. The cam 128 may be rotated in opposite directions from the motor 127 through a transmission 130 to effect rapid traverse movements of the turret in opposite directions. The motor 127 is controlled by motor starters RTF (FIG. 15) and RTR (FIG. 16) as will appear hereinafter.

The cam 128 can also be driven in one direction at a feed rate from the transmission 120 to effect the feed movement of the turret. When this is done the shaft of motor 127 rotates idly. The turret is operatively connected to the cam 128 by a cam follower 131 having a portion within the groove 129.

Figure 19:
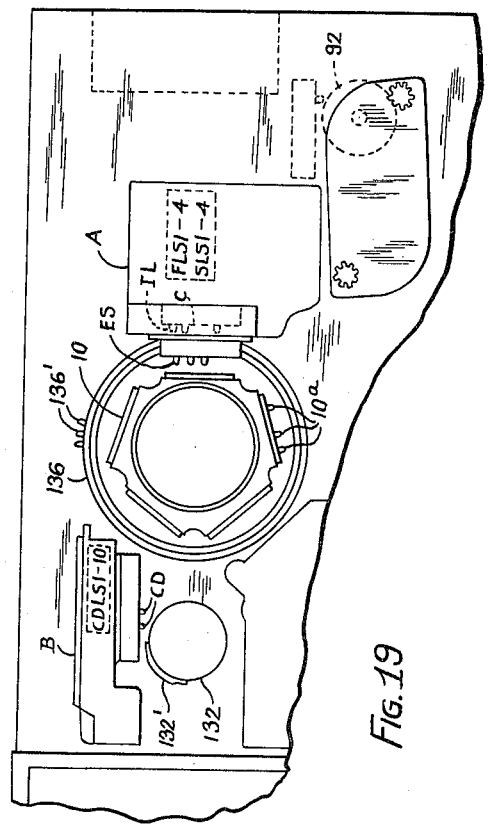
FIG. 19 is a view in elevation of the machine showing relative locations of various limit switches and cams employed in the machine.

As stated hereinbefore, a control drum 10 is carried by the turret support so as to be longitudinally movable and rotatably indexible with the turret. This control drum also includes five faces corresponding to the turret faces which have a plurality of longitudinally extending slots for adjustably mounting a number of dogs 10a (FIG. 19) positioned to actuate a plurality of feed limit switches which may be designated as FLS1 through FLS4 (FIG. 13), and a number of speed limit switches SLS1 through SLS4 (FIG. 13). These feed and speed limit switches have actuating elements FS and are mounted in a suitable switch box A (FIG. 19) with the actuating elements adjacent to the path of longitudinal movement of the turret so as to be actuated by the dogs 10a on the control drum 10 during longitudinal movement of the turret at a rapid traverse speed.

As will appear hereinafter, a selected one of the speed limit switches SLS1 through SLS4 is operated during movement of the turret in a forward direction at a rapid traverse speed to effect energization of a selected one of the solenoids SVA, SVB and SVC. Operation of the selected one of the speed limit switches results in rotation of the spindle at a predetermined speed. A selected feed limit switch is also operated during rapid traverse movement of the turret in the forward direction to effect energization of a selected one of the solenoids FVA, FVB and FVC to provide a selected feed speed of the turret and also a selected feed speed of the front and rear cross-slides.

In order to provide further control of the controlling electrical circuits there is provided an auxiliary cam drum 132 which is arranged for rotation at a speed proportional to the speed of rotation of the turret feed cam 128. The drum 132 includes means for adjustably mounting a number of dogs 132' adapted to actuate a plurality of limit switches designated as CDLS1 through CDLS10. These limit switches may be mounted in a suitable switch box B (FIG. 19) and have actuating elements CD adjacent to the cam drum 132 to be operated at preselected times during longitudinal movement of the turret.

In order to effect indexing rotation of the turret there is provided an index motor 133 which may be drivingly connected to the turret by means of suitable gearing 134 connected between the shaft 135 of the motor 133 and the support for the turret. As will appear hereinafter, the energization of motor 133 is controlled by operation of the limit switch CDLS4 associated with the cam drum 132. The turret support also carries an index control drum 136 which has provision for adjustably mounting a number of dogs 136' for operating actuating elements IL of a plurality of limit switches designated as index limit switches ILS1 through ILS13 (FIG. 13). These limit switches are arranged to be actuated at preselected times during the indexing operation of the turret. The switches ILS1 through ILS13 may be housed in a suitable switch box C located adjacent to the control drum 136 so that the switches may be actuated as the drum 136 rotates with the turret. These limit switches are effective when actuated to control the controlling electrical circuits during the automatic operation of the machine. A Geneva limit switch GLS (FIG. 13) is also operated during indexing of the turret prior to the time when the turret is fully indexed.

As mentioned hereinbefore, the collet and bar feed mechanisms are pressure fluid actuated. The collet mechanism is actuated in response to displacement of a piston 150 positioned within a hollow cylinder 151 and having a piston rod 152 extending outwardly of the cylinder and operatively connected to a plunger 153, which in turn is connected to the lever 35. Displacement of the piston 150 within the cylinder 151 is controlled by a valve 154 including a shiftable valve body connected to an armature 155 associated with the collet solenoid 156 shown in FIG. 17 and referred to more fully hereinafter.

In FIG. 6 the body of the valve 154 is in its normal position when the solenoid 156 is de-energized. For this position of the valve body the collet chuck is closed inasmuch as a conduit 157 which leads to a source of pressure fluid is connected through a passage 158 of the valve 154 to a conduit 159 leading to the upper end of the cylinder 151 so that the piston 150 is forced downwardly to extend the piston rod outwardly of the cylinder and displace the plunger 153 toward the right as viewed in FIG. 5. The conduit 157 is connected to a conduit 160 through a relief valve 161 with the conduit 160 leading to a source of pressure fluid such as a pump through a conduit 162. The portion of the cylinder 151 beneath the piston 150 is connected to drain through a conduit 163 which is connected to drain conduits 164 and 165 through a passage 166 of the valve 154. A spring member 167 may be connected to the shiftable valve body of the valve 154 to bias the valve body to its normal position when the solenoid 156 is de-energized.

When the collet solenoid 156 is energized the armature 155 and the valve body connected thereto is moved upwardly so that the conduit 159 is connected to the conduit 164 through a passage 158' of the valve 154, and the conduit 163 is connected to the conduit 157 through a passage 166' of the valve 154. As a result, the piston 150 is displaced upwardly as viewed in FIG. 6 to effect movement of the plunger 153 toward the left as viewed in FIG. 5 for opening the collet chuck.

The bar feed mechanism is operated in response to displacement of a piston 168 within a hollow cylinder 169 and having a piston rod 170 extending outwardly of the cylinder 169. The piston rod 170 is operatively connected to the annular part 42' of the head assembly 37 so that movements of the piston rod will result in corresponding movement of the part 42'.

Figure 17:
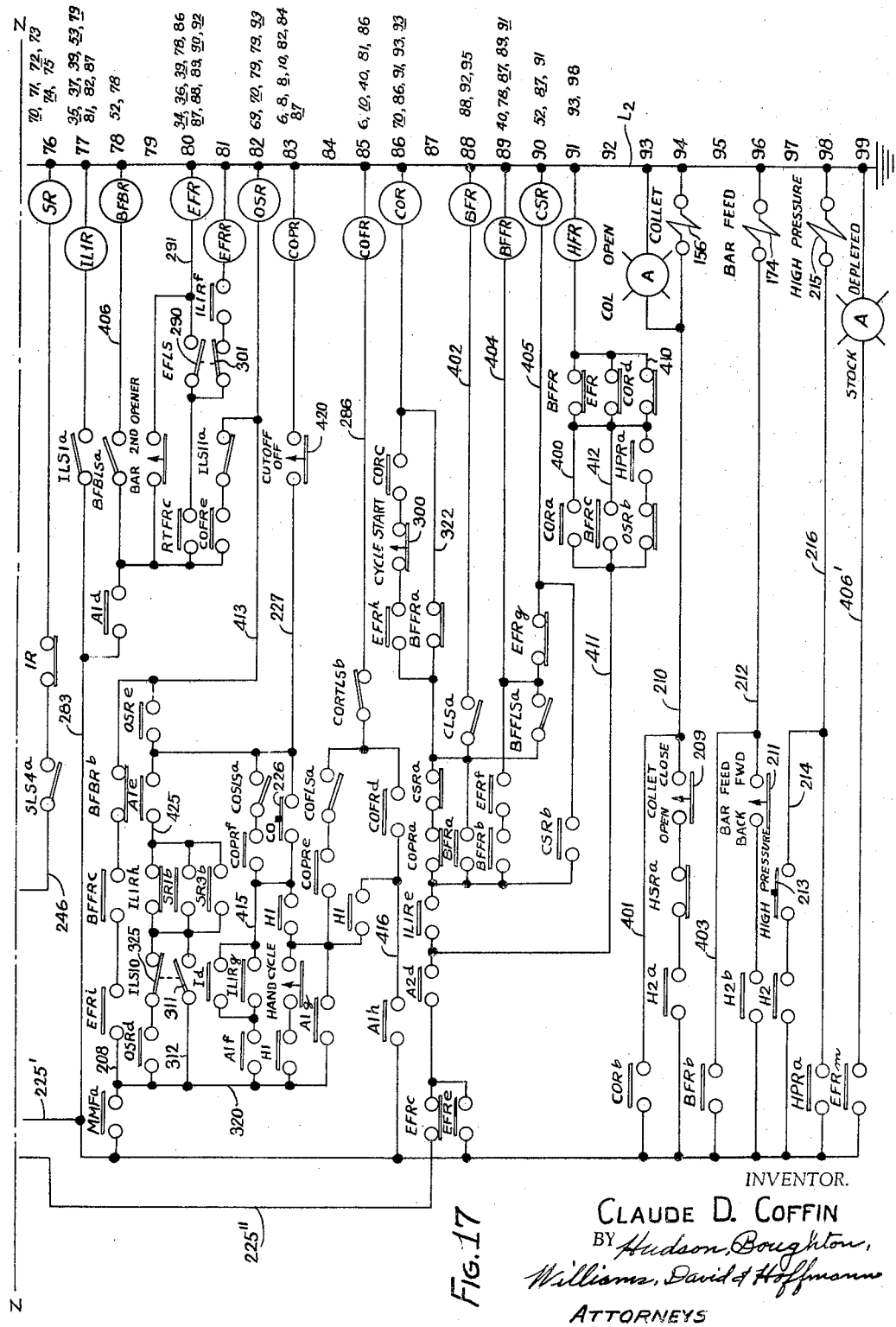

The piston 168 is displaced under the control of a valve 172 having a shiftable body connected to an armature 173 associated with the bar feed solenoid 174 shown in FIG. 17 and referred to more fully hereinafter. When the solenoid 174 is de-energized the pressure conduit 162 is connected to a conduit 175 leading to the upper end of the cylinder 169 through a passage 176 of the valve 172. The lower section of the cylinder 169 is connected to a conduit 177 which in turn is connected to the drain conduit 165 through a passage 178 of the valve 172. A spring 179 biases the shiftable body of the valve 172 into its normal position when the solenoid 174 is de-energized.

When the valve body is in its normal position pressure fluid is introduced to the cylinder 169 through the conduits 162 and 175 through the passage 176 so that the piston 158 is forced downwardly to effect displacement of a rod 171 to which the part 42' and the rod 170 are connected toward the left as viewed in FIG. 5 to displace the bar feed mechanism to its retracted position. When the solenoid 174 is energized, the armature 173 and the valve body attached thereto are moved upwardly as viewed in FIG. 6 whereby the conduit 175 is connected to the drain conduit 165 through a passage 176' of the valve 172, and the conduit 177 is connected to the conduit 162 through a passage 178' of the valve 172. As a result, the piston 168 is forced upwardly to effect displacement of the rod 171 and the part 42' toward the right as viewed in FIG. 5 to advance the bar feed mechanism.

When the part 42' is moved to the right, its shoulder engages the member 46 whereby the tube 39 and the gripped bar also move to the right to effect feeding of the bar. During this time the ring 45 is spaced from the member 46. When the part 42' is retracted, while bar stock is gripped by the feed fingers 40 and the collet chuck, the ring 45 engages the member 46 and thereby retracts the tube 39 relative to the advanced bar.

In order to limit forward movement of the bar stock during advancement of the bar feed mechanism there is provided a stock stop 181 (FIG. 1) which is carried by the turret on a selected one of its faces and which is positioned in the path of the bar stock when the bar stock is advanced by forward movement of the bar feed mechanism. The stop 181 operates to engage the advancing bar stock and to stop its movement so that a desired length of stock projects outwardly from the collet chuck. The stop 181 may be attached to the turret in any desired manner for indexing rotation with the turret. In some instances, it may be desired to employ a stock drop which is mounted by the turret for pivotal movement into and out of its operative bar stopping position. When such a pivotally mounted stop is employed it may be pivoted by means of a piston-cylinder arrangement 182 which is under the control of a valve 183. The arrangement 182 and the valve 183 are operated in a manner which is similar to the operation of the previously described piston-cylinder arrangements and valves for the collet and bar feed mechanisms.

As previously stated, the machine is operated under the control of a number of electrical circuits. These circuits are diagrammatically represented in FIGS. 14 through 17 and include a plurality of switch contacts, relays, and relay contacts. Each relay includes a number of contacts and the contacts of a particular relay are represented by the same reference character as the relay with the letters a, b, c, etc. following.

The switch contacts, relays and relay contacts are associated with electrical conductors which are diagrammatically illustrated as being arranged in vertically spaced rows which are numbered consecutively from 1 through 99 in FIGS. 14 through 17. The numbers of the rows which contain contacts of a particular relay are located to the right of the row which contains the relay. For convenience, when a particular circuit component is referred to the number of the row which contains that component will follow the reference character for the component in parentheses. The circuits may be energized from a conventional source of alternating voltage such as a transformer having a secondary winding S included in a wire 200 connected between power conductors L1 and L2. Relay contacts are illustrated in their normal open or closed position when the associated relay is de-energized.

In order to prepare the machine for receiving the first bar the machine control switch M on the panel P is set by an operator at its "hand" position. This results in closing of the switch contact 201 in wire 201' which causes energization of hand control relay H1 (30) in wire 202 which is connected to wire 201' and to conductor L2. This effects closure of contact H1a (31) and energization of hand control relay H2 (31) in wire 203 in parallel with wire 202. The main motor starter MMF (15) in wire 204 connected to conductor L2 is energized from conductors L1, L2 through contact MMRa (15) of the main motor reverse contactor MMR (16) in wire 205 in parallel to wire 204, contact 206 of a jog switch, contact TRRa of a tap reverse relay, contact 207 of switch ILS8 and wire 225 so that normally open contact MMFa (78) in wire 208 is closed.

A collet selector switch C on the panel P is set to its "open" position which results in closing of its contact 209 (94) in wire 210 to effect energization of the collet solenoid 156 (94) through contact HSRa (94) of a hand spindle speed relay HSR (70), now closed contact H2a (94) and wires 225' and 225.

The bar feed selector switch B also on the panel P is set to its "forward" position which closes its contact 211 (96) in wire 212 to energize the bar feed solenoid 174 through now closed contact H2b (96) and wires 225' and 225. The "high pressure" push button HP on panel P is then depressed which results in closing of its contact 213 (97) in wire 214 and energization of high pressure solenoid 215 (98) in wire 216. This causes opening of the collet chuck and forward movement of the bar feed mechanism and when the collet is fully open and the bar feed mechanism fully forward, the "high pressure" button may be released.

The bar may now be loaded so that the end of the bar extends through the collet sufficiently far to permit the cut off tool to make a cut. The collet selector switch C is now set to its "close" position which opens its contact 209 to de-energize the solenoid 156 and the "high pressure" push button HP is pressed to close its contact 213 which effects closing of the collet. When the collet is fully closed, the bar feed selector switch B is set to its "back" position which opens its contact 211 to de-energize solenoid 174 which causes retraction of the bar feed mechanism and when the bar feed mechanism is fully back, the "high pressure" button is released.

The spindle speed selector switch 55 is actuated to close a selected one of its contacts SS1 (68), SS2 (66) and SS3 (64) in parallel connected wires 217, 218 and 219. The spindle control selector switch SC is now set to its "run" position which closes its contact 220 (68) in wire 221 which causes energization of relay HSR (70). When this occurs the HSRb, c and d contacts (64, 66 and 68) in wires 217, 218 and 219 are closed to effect energization of the selected one of the solenoids SVA, SVB and SVC (65, 67 and 69) in wires 222, 223 and 224 connected in parallel to the wire 225' and conductor 62 through now closed contact H2c in wire 221 and through wire 225'.

The cut off slide 62 is now moved forward at a rapid traverse speed by pushing cut off rapid traverse push button CO to close its contact 226 (83) in wire 227 which energizes relay COPR (83) in wire 227. This push button is released when the cut off tool is near the bar. The cut off feed push button COF is now depressed to close its contact 229 (7) in wire 228 to energize the cut off feed clutch solenoid 230 (6) in wire 231 and the cut off slide 62 now feeds forward until cut off of a small piece of the bar is accomplished. The cut off rapid traverse push button is now depressed until the slide is fully retracted.

After the first bar is loaded and the tooling and machine setup is completed, and the bar has been squared by cutting off a small piece of the bar as above described, the operator sets the machine control switch to the "automatic" setting which closes the contact 232 (32) to effect energization of relay A1 (32) in wire 233 from conductors L1, L2 through wire 225, normally open but now closed contact 234 (27) in wire 235 of switch CDLS4 which is operated when the turret is in its present back position, wire 236, normally open but now closed contact GRa (31), contacts H2d (30) and A2a (30) in wire 237 and contacts H1b (32) and H2e (32) in wire 233. When relay A1 is energized its contact A1a (33) in wire 237 in parallel with wire 233 closes to energize relay A2.

The operator then presses the "cycle start" button CS which closes its contact 238 (35) in wire 239 and operates to establish a circuit to the turret rapid traverse forward relay RTFR (38) in wire 240 and a timing relay TR (35) in wire 241. This circuit may be traced from the conductor L1 through contact PMa (8) of the hydraulic pump motor starter PM (2) in wire 242, wire 225, normally open but now closed contact GRb (32) of the Geneva relay GR (12) in wire 243, contacts A2b (34), RTRa (34), CDLS10a (34), CDLS6a (34), CDLS9a (34), CDLS5a (34), CDLS1a (34) all in wire 266, contacts A1b (35), 238 (35), CDLS2a (35), CDLS3a (35), ILIRa (35) all in wire 239, and contacts OLMTa (36), FLS4a (37), IFRa (36), 3FRa (36), and Ia (36) to conductor L2. When relay TR is energized its contact TRa (36) in wire 244 closes a circuit to the turret rapid traverse forward motor starter RTF (36) which starts the motor 127 to drive the turret forward at a rapid traverse speed.

A holding circuit to relay RTFR, timer TR and starter RTF is established through the same circuit as above described from conductor L1 to contact A1b (35) from which the holding circuit is traced through contacts EFRa (36) or ILIRb (37) if closed, RTFRa (36), FLS4a (37), IFRa (36), 3FRa (36), Ia (36), and TRa (36) to conductor L2.

As the turret moves forward a speed dog 10a on the control drum 10 operates spindle speed limit switch SLS4 which closes its contact SLS4a (76) in wire 246 to establish a circuit to spindle speed relay SR (76) in wire 246. When relay SR is energized its contacts SRa, b and c (71, 73 and 75) in parallel connected wires 247, 248 and 249 close to prepare for energization spindle speed selector relays SR1 (71), SR2 (73) and SR3 (75). As the turret continues to move forward a speed dog operates a selected one of a plurality of spindle speed limit switches SLS1, SLS2 and SLS3 which close their contacts 250, 251 and 252 (71, 73 and 75) and complete one of the previously prepared circuits to the spindle speed selector relays SR1, SR2 and SR3. The energized one of these selector relays closes its contact SR1a, SR2a or SR3a (65, 66 and 67) to establish a circuit to one of the spindle clutch solenoids SVA, SVB and SVC (65, 67 and 69). This causes the spindle to rotate at the selected speed.

At the same time a feed dog 10a on the drum 10 operates feed limit switch FLS4 which closes its contact FLS4b (50) in wire 254 to establish a circuit to feed rate relay FR (50). When relay FR is energized its contacts FRa, b and c (44, 56 and 48) in parallel connected wires 255, 256 and 257 close to prepare for energization feed rate selector relays 1FR (44), 2FR (46) and 3FR (48). These feed rate relays are in shunt circuits which are connected to a series circuit including contacts PMa and GRb, and contacts A2b, RTRa, CDLS10a, CDLS6a, CDLS9a, CDLS5a and CDLS1a all in wire 266.

As the turret continues to move forward a feed dog 10a operates a selected one of a plurality of turret feed limit switches FLS1, FLS2 and FLS3 which closes its contact 258, 259 or 260 (44, 46 or 48) to complete one of the previously prepared circuits to effect energization of one of the feed relays 1FR etc. The energized one of the feed relays closes its contact 3FRb, 2FRa or 1FRb (22, 23 or 24) in wires 261, 262 and 263 to prepare a circuit to one of the feed clutch solenoids FVA, FVB and FVC (22, 23 and 24).

When a feed relay is energized its contact 1FRa (36) or 3FRa (36) opens in the previously described holding circuit for relays RTFR, RTR and TR to interrupt the holding circuit so that the rapid traverse forward movement of the turret is stopped. At this point the timer TR times out to close its contact TRb (24) in wire 264 which effects energization of the selected feed clutch solenoid so that the turret now moves at the selected feed speed and the tools carried thereby perform a machining operation on the bar.

At the end of the forward travel of the turret, the limit switch CDLS1 is operated and opens its contact CDLS1a (34) in wire 266 to interrupt the circuit to the selected feed relay 1FR, 2FR or 3FR to stop the feed movement of the turret. Operation of switch CDLS1 also closes a contact CDLS1b (55) in wire 268 to complete a circuit to the turret rapid traverse reverse relay RTRR (52) in wire 269 through closed contacts PMa (8), GRb (32), A2b (34), CDLS1b (55), ILS6a (55), LCSa (54), RFR2a (53), TRRb (53), ILS9a (52), A1c (52), CDa (52), ILIRc (53), and RTFRb (52).

When relay RTRR is energized a circuit is established to the turret rapid traverse reverse motor starter RTR (54) in wire 270 which starts the motor 127 to move the turret rearwardly at a rapid traverse speed. Relay RTRR and starter RTR are maintained energized through a holding circuit including contact PMa (8), wire 225, contact GRb (32), contact A2b (34), wire 225', and contacts RTRRa (52), RTRRb (53), A1c (52), CDa (52), ILIRc (53), RTFRb (52), and RTRRc (54). When relay RTRR is energized its contact RTRRd (19) in wire 271 closes and completes a circuit to the turret index pilot relay IR (21) in wire 272.

When the turret reaches the end of its rapid traverse reverse stroke, the limit switch CDLS4 is operated and its contact 273 (26) in wire 274 opens to de-energize the cam drum relay CD (26) which opens its contact CDa (52), in wire 269 to interrupt the holding circuit for relay RTRR and starter RTR and stop the rapid traverse reverse movement of the turret. When switch CDLS4 is operated it also closes its contact 234 (27) to establish a circuit to index relay I (27) in wire 235 through wire 225 and normally open but now closed contact IRa (27) of index pilot relay IR (21) and to index motor starter IM (28) in wire 276. This initiates indexing of the turret. When relay I is energized its contact Ib (31) in wire 277 closes to complete a circuit to relay RTFR (38) through contact PMa (8), wire 225, contact Ib (31), contacts A2b (34), RTRa (34), CDLS10a (34), CDLS6a (34), CDLS9a (34), CDLS5a (34), and CDLS1a (34), all in wire 266 and contacts A1b (35) ILIRb (37), Ic (37), A2c (36), 1FRa (36) and 3FRa (36). Relay RTFR is sealed in through its now closed contact RTFRa (36) in wire 278.

As the turret is indexing the Geneva limit switch GLS is operated to open its contact GLSa (12) in wire 243 to de-energized the Geneva relay GR which closes its contact GRc (28) in wire 280. Subseqeunt to this when the turret is nearly indexed, index limit switch ILS5 is operated to open its contact ILS5a (21) in wire 272 to de-energize index delay IR (21) which opens its contact IRa (27) in wire 235 so that the normally closed contact GRc (28) in wire 280 now controls energization of the index relay I and the index motor starter IM.

When the turret is fully indexed Geneva limit switch GLS is operated to close its contact GLSa (12) to effect energization of Geneva relay GR (12) which opens its contact GRc (28) to de-energize relay I and motor starter IM. When relay I is de-energized its contact Ia (36) in wire 244 closes to energize timer TR and motor starter RTF and the turret starts forward again in rapid traverse.

The above cycle wherein the turret moves forward in rapid traverse, feeds, reverses in rapid traverse and indexes continues until the turret indexes to a face wherein a peg or dog on the index drum 136 operates cycle stop limit switch ILS1 at the end of an index. When switch ILS1 is operated its contact ILS1a (77) in wire 283 is closed and the cycle stop relay ILIR (77) is energized through wire 225'. At this time the cut off slide 62 is moving forward toward the bar as will be explained more fully hereinafter.

At the end of this index when switch ILS1 is operated, relay I is de-energized as explained above to energize timer TR and starter RTF so that the turret starts forward in rapid traverse. As the turret moves forward a feed dog 10a effects interruption of the holding circuit for relay RTFR, starter RTR and timer TR as previously described to stop the turret rapid traverse forward movement and to start the turret feed. As the turret feeds a feed stop dog carried by drum 136 operates the feed limit switch FLS4 to close its contact FLS4b (50) and energize feed relay FR (50) which opens contacts FRd, FRe and FRf (43, 45 and 47) in the holding circuits for relays 1FR, 2FR and 3FR to de-energize the selected feed relay 1FR, 2FR or 3FR which results in de-energization of the selected feed clutch solenoid FVA, FVB or FVC (22, 23 and 24). This causes the turret to stop with its stock stop 181 just clear of the work piece and to remain in such position until the cut off tool cuts a piece from the bar. The stop 181 is carried by the turret on the face for which the switch ILS1 is to be operated.

As will presently appear when the cut off slide 62 is fully forward, limit switch CORTLS is operated to close its contact CORTLSa (39) in wire 284 which energizes motor starter RTF, relay RTFR and timer TR through wire 225, the closed contacts in wire 266 and through closed contacts A1b (35), CORTLSa (39), ILIRd (39), EFRb (39), 1FRa (36), 3FRa (36) and TRa (36). Contact ILIRd (39) is closed at this time due to the previous energization of relay ILIR. This causes the turret to proceed from its stopped position wherein the stock stop is just clear of the bar to the end of its forward stroke at a rapid traverse speed.

At the end of the turret forward stroke the limit switch CDLS1 is operated to open its contact CDLS1a (34) in the circuit including wire 266, relay RTFR, timer TR and motor starter RTR which stops the turret. Operation of switch CDLS1 also closes its contact CDLS1b (55) in wire 268 to prepare a circuit to relay RTRR and motor starter RTR through contacts PMa (8), GRb (32), and A2b (34), wire 225', and contacts CDLS1b (55), ILS6a (55), LCSa (54), RFR2a (53), TRRb (53), ILS9a (52), A1c (52), CDa (52), ILIRc (53) and RTFRb (52). It is noted that starter RTR and relay RTRR are not energized at this time because normally closed contact ILIRc (53) is now open due to the energized condition of cycle stop relay ILIR. The turret therefore remains in its forward position until the bar has been fed and the bar feed mechanism has been returned as will presently appear.

As will be more fully described hereinafter, operation of switch CORTLS also opens its contact CORTLSb (85) in wire 286 to de-energize previously energized cut off feed relay COFR (85) which opens contact COFRa (6) in wire 231 to de-energize the cut off feed clutch solenoid 230 for disengaging the cut off feed clutch. When relay COFR is de-energized its contact COFRb (10) in wire 287 closes to establish a circuit to the cut off rapid traverse clutch solenoid 313 (9) which causes engagement of the cut off rapid traverse clutch and the cut off slide retracts at a rapid traverse speed.

When the slide 62 reaches its fully retracted position, the limit switch COSLS is actuated as will presently appear to open its contact COSLSa (82) for de-energizing previously energized cut off pilot relay COPR (83) which operates to de-energize cut off rapid traverse clutch solenoid 313 (9), and to de-energize the optimum speed relay OSR (82). When relay OSR is de-energized, the contact OSRa (69) opens to de-energize the hand spindle speed relay HSR (70) which opens the contacts HSRb, c and d (64, 66 and 68) to de-energize the selected one of the spindle clutch solenoids SVA, SVB or SVC. This causes the spindle to stop.

When relay COPR is de-energized the contact COPRa (87) closes to complete a circuit to the collet open relay COR (86) through wires 225 and 225', closed contact CDLS1b (55), wire 225" and contacts EFRc (87), A2d (87), ILIRe (87), COPRa (87), CSRa (87) and BFFRa (87), all in wire 322. When relay COR is energized its contacts CORa and b (91 and 93) in wires 400 and 401 close to effect energization of the high pressure relay HPR (91) and the collet solenoid 156 (94). Energization of relay HPR closes contact HPRa (98) in wire 216 to cause energization of the high pressure solenoid 215 (98) and the collet opens.

When the collet is fully open the limit switch CLS is operated to close contact CLSa (88) in wire 402 to energize a bar feed relay BFR (88) through wires 225 and 225', contact CDLS1b (55), wire 225", contacts EFR*c* (87), A2*d* (87), ILIR*e* (87), COPR*a* (87), CSR*a* (87) all in wire 322 and contact CLS*a* (88). The relay BFR is held energized through a holding circuit including its now closed contact BFR*a* (88). When relay BFR is energized its contact BFR*b* (95) in wire 403 closes to energize solenoid 174 through wires 225, 225', 403 and 212 and the bar feed moves forward to thereby move the bar forward until the end of the bar hits the stock stop 181 carried by the turret.

When the bar feed is fully forward a bar feed forward limit switch BFFLS is actuated to effect energization of bar feed forward relay BFFR (89) in wire 404 and collet close relay CSR (90) in wire 405. This is accomplished when contact BFFLS*a* (90) closes and completes circuits to these relays through wires 225 and 225', closed contact CDLS1*b* (55), wire 225'', and contacts EFR*c* (87), A2*d* (87), ILIR*e* (87), BFR*a* (88) and BFFLS*a* (90). Relay CSR is sealed in through a circuit including contacts CDLS1*b* (55), EFR*c* (87), A2*d* (87), ILIR*e* (87) and now closed contact CSR*b* (91). When relay BFFR is energized its contact BFFR*a* (87) opens to de-energize relay COR (86) which results in opening of contact COR*b* (93) and de-energizing of solenoid 156 so that the collet closes. Energization of relay CSR causes its contact CSR*a* (87) to open to interrupt the initiating circuit to relay COR. At the same time the contact CSR*c* (52) closes to prepare a circuit to relay RTRR (52) and motor starter RTR (54).

When the collet is fully closed, the limit switch CLS is operated to open its contact CLS*a* (88) for de-energizing relay BFR (88). When relay BFR is de-energized, the contact BFR*b* (95) opens to de-energize solenoid 174 and the bar feed retracts to its back position. At the same time, the contact BFR*a* (88) opens to de-energize relay BFFR. When the bar feed is fully retracted it operates a limit switch BFBLS which opens its contacts BFBLS*a* (78) in wire 406 to de-energize bar feed back relay BFBR which closes the normally closed contact BFBR*a* (52) and completes the circuit to relay RTRR (52). Relay RTRR is thereby energized to energize motor starter RTR and the turret moves back in rapid traverse and indexes as previously explained. When the turret is fully indexed, limit switch ILS1 is operated to open its contacts ILS1*a* (77) to de-energize relay IRIR which opens the normally open contact ILIR*e* (87) to de-energize collet close relay CSR (90).

The above-described cycle of operations continues until the feed fingers 40 drop off of the bar during retraction of the bar feed mechanism when there remains only a remnant of the bar too short for a workpiece. When the feed fingers are no longer on a bar, empty finger limit switch EFLS is operated to close the normally open contact 290 (80) in wire 291. This occurs on the reverse stroke of the bar feed mechanism and results in a circuit being completed to empty finger relay EFR (80) through closed contacts A1*d* (78), RTFR*c* (80) and 290 (80). When relay EFR is energized, its contact EFR*m* (99) in wire 406' is closed to energize an alarm A which may be a light or other device to indicate to the operator that the bar is depleted. The machine continues its normal cycle until the turret has reversed and completed its index into the stock stop face at which time switch ILS1 is actuated to close contact ILS1*a* (77) for energizing cycle stop relay ILIR.

When this occurs the turret does not rapid traverse forward in the usual manner but remains in its back position because the circuit to relay RTFR was interrupted by the opening of contact EFR*d* (34) when relay EFR was energized, and by the opening of contact ILIR*a* (35) when relay ILIR was energized. Relay EFR is of the latched-in type and its contacts remain in positions established when relay EFR was energized even though contact RTFR*c* is now open. As will presently appear, the turret remains in its reverse position until after a new bar is loaded into the machine.

When the cut off slide has completed cutting off the last piece, switch CORTLS is actuated to close contact CORTLS*a* but this is ineffective to energize relay RTFR since normally closed contact EFR*b* (39) is now open. The cut off slide rapid traverse reverses and when it reaches the retracted position it causes the spindle to stop, effects opening of the collet and causes the bar feed mechanism to move forward as previously described. When the bar feed moves forward it ejects the remnant bar and when it is fully forward switch BFFLS is operated to close contact BFFLS*a* (90) which results in energization of relay BFFR through wires 225 and 225', and closed contacts EFR*e* (88), A2*d*, IIL (87), R*e* (87), BFR*a* (88) and BFFLS*a* (90). Relay BFFR is sealed in through closed contacts EFR*e* (88), A2*d* (87), ILIR*e* (87), BFFR*b* (89) and EFR*f* (89). It is noted that collet close relay CSR is not energized at this time in the usual manner because normally closed contact EFR*g* (90) is now open. Also, relay COR is not de-energized in the normal manner by energization of relay BFFR but is sealed in through closed contacts EFR*c* (87), A2*d* (87), ILIR*e* (87), COPR*a* (87), CSR*a* (87), EFR*h* (86), "cycle start" contact 300 and COR*c* (86).

The machine functions are now in the following state:

(1) Turret is back on its stock stop face.
(2) Cut off slide is back.
(3) Collet is open.
(4) Bar feed is forward.
(5) Main motor and pump running.
(6) Spindle is stopped.
(7) Automatic relays A1 and A2 are energized.
(8) Collet and bar feed solenoids are energized through now closed contacts COR*b* and BFR*b* respectively.

The operator now loads a new bar into the collet with a sufficient length of the bar extending beyond the cut off tool to allow squaring of the end of the bar by operation of the cut off slide. The operator presses the "cycle start" button CS which opens its contact 300 (86) to open the circuit including collet open relay COR (86) for de-energizing relay COR. It is noted that even though the "cycle start" contact 238 (35) is closed by pressing the "cycle start" button, relay RTFR is not energized because normally closed contacts EFR*d* (34) and ILIR*a* (35) are now both open.

When relay COR is de-energized its normally open contact COR*b* (93) in wire 401 opens to de-energize solenoid 156. At the same time its contact COR*d* (93) in wire 410 closes to effect energization of high pressure relay HPR (91) through wires 225 and 225' and closed contacts EFR*e* (88) and A2*d* (87), wire 411, contact BFR*c* (92) in wire 412 and contact COR*d* (93). This causes the collet to close and when fully closed it operates switch CLS to open contact CLS*a* (88) which interrupts the circuit to relay BFR (88). This effects de-energization of relay BFR and the bar feed mechanism retracts. Note that relay HPR is still energized even though contact BFR*c* (92) is now open because HPR relay is sealed in through closed contacts OSR*b* (93), HPR*a* (93) and COR*d* (93) which shunt now open contact BFR*c*.

When the bar feed mechanism is fully retracted it operates limit switch BFBLS which opens contact BFBLS*a* (78) to de-energize relay BFBR (78) so that normally closed contact BFBR*b* (78) is closed to complete a circuit to relay OSR (82) through wire 225 and 225', closed contacts MMF*a* (78), EFR*i* (78), BFFR*c* (78), BFBR*b* (78) and wire 413. When relay OSR is energized the normally closed contact OSR*b* (93) in wire 410 opens to interrupt the holding circuit for relay HPR and relay HPR is thereby de-energized. Energization of relay OSR also opens the normally closed contact OSR*c* (70) to de-energize relays SR1, SR2 and SR3 to close the normally open contacts SR1*a*, SR2*a* and SR3*a* (65, 66 and 67). This causes energization of the selected one of the spindle clutch solenoids SVA, SVB or SVC so that the spindle starts to rotate at the selected speed.

When relay OSR is energized it also closes the two normally open contacts OSRd and e (79) to seal itself in and to energize the cut off pilot relay COPR (83) through a circuit including closed contacts MMFa (78), EFRi (78), BFFRc (78) all in wire 208 and contact OSRe (79). When relay COPR is energized the cut off slide 62 moves forward in rapid traverse as will be presently explained. As the cut off slide moves forward the switch COFLS is operated which results in the cut off slide continuing its forward movement at a feed rate as described hereinafter. This is accomplished when relay COFR is energized by closure of contact COFLSa (84).

When relay COFR is energized its normally open contact COFRc (40) is closed to energize starter RTF, relay RTFR and timer TR through a circuit including closed contacts PMa (8), GRb (32), A2b (34), RTRa (34), CDLS10a (34), CLDS6a (34), CDLS9a (34), CDLS5a (34), CDLS1a (34), A1b (35), BFFRd (40), COFRc (40), IFRa (36), 3FRa (36) and Ia (36). When this occurs the turret starts forward in rapid traverse substantially simultaneously with forward movement of the cut off slide.

When relay RTFR is energized the normally open contact RTFRc (80) is closed to effect energization of delatching coil EFRR (81) through wires 225, 225′ and 283 and closed contacts A1d (78), RTFRc (80), contact 301 (81) of switch EFLS which is now in its normally closed position due to the presence of bar stock, and ILIRFf (81). When coil EFRR is energized it effects unlatching of relay EFR which returns to normal to close its normally closed contact EFRa (36) for establishing a sealing circuit for relay RTFR, timer TR and starter RTF which shunts now closed contact BFFRd (40) in the initiating circuit for relay RTFR, timer TR and starter RTF. Energization of coil EFRR also results in the opening of normally open contact EFRh (36) which opens the circuit including relay COR. Normally open contact EFRf (39) also opens to effect de-energization of relay BFFR. When relay BFFR is de-energized the normally open contact BFFRd (40) is opened to open the initiating circuit to relay RTFR.

As the turret moves forward switch FLS4 is operated so that the turret stops with its stock stop just clear of the work piece and stays there until a piece is cut off. When the cut off slide is fully forward switch CORTLS is operated and the operation continues as previously described.

The electrical sequence of the cut off operation may now be described with reference to FIGS. 14 through 17. In the following description it will be assumed that the turret has just completed indexing into its final face five and that switch ILS1 has been actuated to energize relay ILIR.

When the turret is fully indexed to face five where cut off of the bar is desired, switch ILS10 is actuated by a peg or dog 136′ on the drum 136 and a circuit to cut off pilot relay COPR (83) in wire 227 connected to conductor L2 is completed by the closure of normally open contact 311 (80) of switch ILS10 in wire 312. This circuit may be traced from conductor L1, contacts PMa, wire 225, contacts GRb, A2b, wire 225′, contacts MMFa, 311, SR1b (80) or SR3b (81), A1e (79) and wire 227.

When relay COPR is energized contact COPRb (10) closes to energize cut off rapid traverse clutch solenoid 313 (9) from the rectifier R connected between conductors L1, L2, wire 314, closed contacts A2e (10), COFLSb (10), COPRb (10), COFRb (10), and back to the rectifier R through wire 315. Energization of relay COPR also opens contact COPRc (8) to de-energize the cut off brake solenoid 316 in wire 317 connected between wires 314 and 315. The cut off slide 62 now moves forward toward the bar at a rapid traverse speed.

When relay COPR is energized it closes contact COPRd (6) to prepare a circuit to the cut off feed clutch solenoid 230, closes contact COPRe (84) to prepare a circuit to the cut off feed relay COFR, and opens contact COPRa (87) to interrupt the circuit to the collet open relay COR. Energization of relay COPR also closes contact COPRf (82) to prepare a holding circuit from conductor L1 through wire 225′, closed contact MMFa (78), wire 320, closed contacts A1f (82), ILIRg, COPRf (82), and open contact COSLSa (82) all in wire 415.

The cut off slide 62 now moves forward at a rapid traverse rate and the cut off slide cam drum 92 rotates to operate the cut off slide stop limit switch COSLS which completes the holding circuit for relay COPR through now closed contact COSLSa in wire 415. The cut off slide cam drum also operates the feed limit switch COFLS which closes its contact COFLSa (84) to energize cut off feed relay COFR through wires 225 and 225′ and closed contacts MMFa (78), A1g (84), COPRe (84), COFLSa (84), CORTLSb (85), and wire 286. Operation of switch COFLS also opens the contact COFLSb (10) to interrupt the circuit to solenoid 313 and energization of relay COFR opens contact COFRb (10) to hold the circuit to solenoid 313 open, and closes contact COFRa (6) to complete a circuit to cut off feed clutch solenoid 230 through rectifier R, wire 314, contact A2e, wire 320, contact COPRd and contact COFRa. Relay COFR is held in through a holding circuit including closed contacts A1h (86) and COFRd (86) both in wire 416 and contact CORTLSb. The cut off slide now proceeds forward toward the bar at a feed speed. During this time the switch FLS4 has been actuated in response to forward movement of the turret and the turret stops short of its extreme forward position as previously explained.

When the cut off operation is completed and the slide 62 is at the extreme end of its forward stroke, the cam drum 92 operates cut off rapid traverse limit switch CORTLS which opens contact CORTLSb (85) to interrupt the holding circuit for relay COFR which results in de-energization of relay COFR. Operation of switch CORTLS also closes contact CORTLSa (39) to energize timer TR, relay RTFR and starter RTF through wires 225 and 266, and closed contacts A1b (35), CORTLSa (39), ILIRd (39), EFRb (39), IFRa (36), 3FRa (36), Ia (36) and TRa (36). This causes the turret to move forward at a rapid traverse speed from its short position to a position wherein the stock stop 181 is just clear of the bar. The turret remains in its new position until the bar has been fed and the bar feed has been returned. If the cut off is occurring at a time prior to energization of relay ILIR as will presently appear then operation of switch CORTLS is ineffective to energize relay RTFR since contact ILIRd is open.

When relay COFR is de-energized by operation of switch CORTLS its contact COFRa (6) opens to interrupt the circuit to solenoid 230, and its contact COFRb (10) closes to close a circuit to solenoid 313 through rectifier R, and contacts A2e, COFLSb, COPRb and COFRb all in wire 287. This causes the cut off slide 62 to retract at a rapid traverse speed away from the bar.

When the cut off slide is fully retracted, the cam drum 92 operates switch COSLS which opens its contact COSLSa (82) to interrupt the holding circuit for relay COPR. When relay COPR is de-energized its contact COPRb (10) opens and interrupts the circuit to solenoid 313. In addition, contact COPRd (6) opens to open the circuit to solenoid 230, contact COPRe (84) opens in the sealing circuit for relay COFR, and contact COPRa (87) closes to establish a circuit to the collet open relay COR through closed contacts EFRc, A2d, ILIRe, COPRa, CSRa, and BFFRa all in wire 322. It is noted that relay COR can be energized only when relay ILIR is energized so that when the cycle is stopped the collet chuck opens and the bar feed mechanism advances the bar against the stop 181 on the turret.

In the present invention the cut off operation can be performed at selected times prior to energization of the cycle stop relay ILIR. When the cut off operation is so performed it is done while the turret is performing a machining operation on the bar. The bar is not advanced, however, until a cut off operation is completed subsequent to energization of the cycle stop relay ILIR as above explained.

The cut off operation is initiated when index limit switch ILS10 is actuated during indexing of the turret by a cut off start peg or dog 136' inserted on the index control drum 136 at a position corresponding to a selected face of the turret where initiation of the cut off is desired. As an example, assume that it is desired to initiate a cut off operation when the turret is indexed to faces two, four and five. For this assumption cut off start pegs are inserted on the index drum 136 for faces two, four and five of the turret. A cycle stop peg or dog and a peg or dog for final cut off spindle speed are inserted in the index drum 136 for face five of the turret.

With this arrangement when the turret is fully indexed to face two, limit switch ILS10 is actuated and relay COPR is energized as explained previously except now through a circuit including contact ILIRh (79). When this occurs the cut off slide 62 starts forward in rapid traverse and the cut off cam drum 92 rotates to operate switch COFLS which results in the slide 62 traversing forward at a feed rate. During this time the turret has moved forward such that the tools on face two of the turret are operating on the bar, and when the turret is fully forward it will retract at a rapid traverse speed as previously explained.

When the face two machining operation is finished and the turret has retracted, the turret indexes to face three. During this index switch ILS10 is not actuated and relay COPR is held in through a circuit including contacts MMFa, A1f, Id, COPRf, COSLSa, and contact 420 of the cut off stop push button so that the feed movement of slide 62 continues. When the turret is fully indexed to face three, relay I is de-energized and contact Id opens to interrupt the sealing circuit for relay COPR and this relay drops out so that the cut off slide 62 dwells in its partly forward position.

When the face three machining operation is finished and the turret has retracted and has indexed to face four, relay COPR is again energized by operation of switch ILS10 and the cut off slide 62 feeds forward from its partly forward position to continue the cut off operation. When the turret is indexed into face four and completes its forward movement it reverses at a rapid traverse speed.

When the turret is fully retracted on face four it indexes to face five and the cycle stop limit switch ILSI is operated to energize relay ILIR. At this time limit switch ILS11 is also operated by the final cut off spindle speed peg to close its contacts ILS11a (81). During this time relay COFR is being held energized by the cut off slide cam drum 92 so that contact COFRe (81) is closed to effect energization of relay OSR through wires 225 and 283 and closed contacts A1d, COFRe and ILS11a. Relay OSR is sealed in through contact MMFa and through contact A1f (wire 415), ILIRg, COPRf, COSLSa and OSRe. When this occurs the spindle speed is now that which was selected for final cut off speed. The cycle of events now continues as described previously.

Although the invention has been described with reference to certain specific embodiments thereof, numerous modifications are possible and it is desired to cover all modifications falling within the spirit and scope of the appended claims.

Having described my invention, I claim:

1. A machine tool for operating on a length of bar stock comprising means for feeding the bar stock to position a predetermined portion thereof in machining position, means for machining the predetermined portion of the bar stock including cross and turret slides and an indexible turret on said turret slide, a cutoff slide adapted to carry a cutoff tool and movable to cut said bar stock transverse to the elongation thereof, cycle control means for cyclically operating said machine through a work cycle which includes the feeding of a predetermined portion of bar stock to machining position, machining said portion and cutting off said machined portion, a control element for said cutoff slide actuatable to actuate movement of said cutoff slide to square off the end of a new length of bar stock prior to a work cycle being performed thereon, and means responsive to the movement of said cutoff slide to square off the end of a new length of bar stock for starting the cyclical operation of the machine on the new length of bar stock.

2. A machine tool for operating on a length of bar stock comprising means for feeding the bar stock to position a predetermined portion thereof in machining position, means for machining the predetermined portion of the bar stock including cross and turret slides and an indexible turret on said turret slide, a cutoff slide adapted to carry a cutoff tool and movable from a retracted position in a forward feed direction to a forward position to cut said bar stock transverse to the elongation thereof and for return movement to its said retracted position, cycle control means for cyclically operating said machine through a work cycle which includes the feeding of a predetermined portion of the bar stock to machining position, machining said portion and cutting off said machined portion and including means responsive to movement of the cutoff slide to its said retracted position from its forward position to actuate feeding of said bar stock, control means for stopping the cyclical operation of the machine when the length of bar stock is shorter than a predetermined length to condition the machine for receipt of a new length of bar stock, a control element for said cutoff slide actuatable to actuate movement of said cutoff slide from its said retracted position to its forward position and return to its retracted position to square off the end of a new length of bar stock prior to a work cycle being performed thereon whereby return of the cutoff slide actuates feeding of said bar stock and the cyclical operation of the machine.

3. A machine tool for operating on a length of bar stock comprising means for feeding the bar stock to position a predetermined portion thereof in machining position, means for machining the predetermined portion of the bar stock including cross and turret slides and an indexible turret on said turret slide, a cutoff slide adapted to carry a cutoff tool and movable to cut said bar stock transverse of the elongation thereof, cycle control means for cyclically operating said machine through a work cycle which includes the feeding of a predetermined portion of bar stock to machining position, machining said portion and cutting off said machined portion, sensing means effective during each work cycle for sensing the length of the remnant piece of bar stock and operable when said remnant piece is shorter than a predetermined length, control means responsive to operation of said sensing means for stopping the cyclic operation of the machine and conditioning the machine for receipt of a new length of bar stock, a control element for said cutoff slide actuatable to actuate movement of said cutoff slide to square off the end of the new length of bar stock prior to a work cycle being performed thereon, and means responsive to movement of the cutoff slide when squaring off a new length of bar stock for starting the cyclical operation of the machine on the new length of bar stock.

4. A machine tool as claimed in claim 3 wherein said control means includes means responsive to operation of said sensing means for conditioning said cycle control means to actuate said feed means to eject the remnant length of bar stock which is shorter than said predetermined length.

5. A machine tool as defined in claim 3 wherein said control means includes a switch closed upon operation of said sensing means and a relay means operatively connected to the switch and actuated upon closing of said switch.

6. A machine tool as claimed in claim 3 wherein said feed means includes feed fingers having a gripping engagement with the bar stock and movable from a retracted position in a forward feed direction to feed said bar stock said predetermined length and movable in a reverse direction to the retracted position relative to the bar stock for subsequent feeding of the bar stock.

7. A machine tool as claimed in claim 3 wherein said cycle control means includes circuit means for controlling the operation of said cutoff slide, and said control means includes contacts in said circuit means closed in response to operation of said sensing means during said one cycle to render said cutoff means operative to square off the end of the new length of bar stock when said control element is actuated.

8. A machine tool as claimed in claim 3 wherein said cycle control means includes first circuit means for controlling the operation of said means for feeding said bar stock, second circuit means for controlling the operation of said means for machining bar stock, third circuit means for controlling the operation of said cutoff means, and said control means includes contact means in said second circuit means broken in response to operation of said sensing means in one cycle for rendering the means for machining inoperative in the next cycle.

9. A machine tool as defined in claim 3 wherein said feed means comprises feed fingers having a gripping engagement with said bar stock and movable from a retracted position in a forward feed direction to a forward position to feed said bar stock into machining position and movable in a reverse direction relative to the bar stock to said retracted position, and said machine tool further includes collet means having an open position wherein it releases said bar stock prior to movement of said feed member in said forward direction and a closed position wherein it grips said bar stock prior to movement of said feed member in said reverse direction, said means responsive to movement of the cutoff slide includes means for opening said collet means subsequent to said squaring off, and means responsive to opening of said collet for actuating movement of said feed fingers.

10. A machine tool for operating on a length of bar stock comprising means for feeding the bar stock to position a portion thereof in machining position, means for machining the portion of the bar stock including cross and turret slides and an indexible turret on said turret slide, a cutoff slide adapted to carry a cutoff tool and movable to cut said bar stock transverse to the elongation thereof, cycle control means for cyclically operating said machine tool through a work cycle which includes feeding of a predetermined portion of bar stock to machining position, machining said portion and cutting off said machined portion, said feed means including feed fingers operable to grip said bar stock and movable from a retracted position in a forward feed direction to a forward position to feed said bar stock into machining position and movable in a reverse direction relative to the bar stock to the retracted position during each work cycle, sensing means for sensing a remnant length of bar stock shorter than a predetermined length, means responsive to said sensing means for actuating said feed fingers to move in a forward feed direction to eject the remnant length of bar stock prior to positioning a new length of bar stock in said machine tool and for stopping the cyclical operation of the machine to condition the machine for receipt of a new length of bar stock, a control element for said cutoff slide actuatable to actuate movement of the cutoff slide to square off the end of the new length of bar stock prior to a work cycle being performed thereon, and means responsive to movement of the cutoff slide when squaring off a new length of bar stock to start the cyclical operation of the machine on the new length of bar stock.

References Cited by the Examiner
UNITED STATES PATENTS

| 622,760 | 4/99 | Davenport | 226—11 |
| 2,506,515 | 5/50 | Miller | 29—41 |
| 2,669,345 | 2/54 | Brown | 226—11 |

WILLIAM W. DYER, JR., *Primary Examiner.*